US010133031B2

United States Patent

(12) United States Patent
Hsieh et al.

(10) Patent No.: US 10,133,031 B2
(45) Date of Patent: Nov. 20, 2018

(54) OPTICAL IMAGING LENS

(71) Applicant: GENIUS ELECTRONIC OPTICAL CO., LTD., Taichung (TW)

(72) Inventors: Hung-chien Hsieh, Taichung (TW); Wenbin Lin, Xiamen (CN); Binwei Zhang, Xiamen (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 108 days.

(21) Appl. No.: 15/442,426

(22) Filed: Feb. 24, 2017

(65) Prior Publication Data

US 2018/0188487 A1 Jul. 5, 2018

(30) Foreign Application Priority Data

Dec. 30, 2016 (CN) .......................... 2016 1 1253473

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

*Primary Examiner* — Jack Dinh

(74) *Attorney, Agent, or Firm* — Baker & McKenzie LLP

(57) ABSTRACT

Present embodiments provide for an optical imaging lens. The optical imaging lens includes a first lens element, a second lens element, a third lens element, a fourth lens element, a fifth lens element, a sixth lens element and seven lens element positioned in an order from an object side to an image side. Through the arrangement of convex or concave surfaces of the seven lens elements, the length of the optical imaging lens may be shortened while providing better optical characteristics and imaging quality.

18 Claims, 33 Drawing Sheets

| EFL (Effective focal length) = 3.986 mm, HFOV (Half field of view) = 39.169deg., TTL = 5.082 mm, Image height = 3.33mm, Fno = 2.0 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 100 | Aperture stop | ∞ | -0.2766 | | | | |
| 111 | 1st lens element | 1.8579 | 0.6600 | 1.545 | 55.913 | 3.426 | plastic |
| 112 | | 198.8674 | 0.1428 | | | | |
| 121 | 2nd lens element | -13.0278 | 0.2211 | 1.661 | 20.401 | -8.171 | plastic |
| 122 | | 9.4180 | 0.4034 | | | | |
| 131 | 3rd lens element | 8.2872 | 0.2598 | 1.661 | 20.401 | 13.772 | plastic |
| 132 | | 84.3965 | 0.2408 | | | | |
| 141 | 4th lens element | -2.0457 | 0.3785 | 1.535 | 55.690 | -4.958 | plastic |
| 142 | | -9.4254 | 0.0552 | | | | |
| 151 | 5th lens element | 2.7387 | 0.5572 | 1.535 | 55.690 | 2.596 | plastic |
| 152 | | -2.6341 | 0.1039 | | | | |
| 161 | 6th lens element | -2.6382 | 0.4337 | 1.661 | 20.401 | 34.408 | plastic |
| 162 | | -2.5215 | 0.6600 | | | | |
| 171 | 7th lens element | -2.5819 | 0.2200 | 1.661 | 20.401 | -2.446 | plastic |
| 172 | | 4.5724 | 0.2464 | | | | |
| 181 | IR cut filter | ∞ | 0.2100 | 1.517 | 64.167 | | |
| 182 | | ∞ | 0.2891 | | | | |
| 190 | Image plane | ∞ | | | | | |

FIG. 8

| Aspherical parameters | | | | |
|---|---|---|---|---|
| Surface # | K | A4 | A6 | A8 |
| 111 | 0.000000E+00 | -1.236487E-03 | 8.526967E-03 | -2.003030E-02 |
| 112 | 0.000000E+00 | -2.936763E-03 | 1.344374E-02 | -1.231176E-02 |
| 121 | 0.000000E+00 | -1.671126E-02 | 7.080702E-02 | -7.540819E-02 |
| 122 | 0.000000E+00 | -3.111917E-02 | 3.989763E-02 | -2.130103E-02 |
| 131 | 0.000000E+00 | -9.371013E-02 | -1.073664E-01 | 5.918014E-02 |
| 132 | 0.000000E+00 | 1.199422E-02 | -1.244855E-01 | 8.906658E-02 |
| 141 | 0.000000E+00 | 2.243605E-01 | -9.979737E-02 | 2.768139E-02 |
| 142 | 0.000000E+00 | -1.043045E-01 | 4.564356E-02 | 4.405320E-03 |
| 151 | 0.000000E+00 | -1.035673E-01 | -4.879741E-02 | 2.697126E-02 |
| 152 | 0.000000E+00 | 3.773135E-01 | -4.227823E-01 | 2.247346E-01 |
| 161 | -1.197568E+01 | 9.954130E-02 | -1.354410E-01 | 9.822682E-02 |
| 162 | -1.414132E-02 | -1.498560E-02 | 3.045291E-02 | -4.386512E-03 |
| 171 | 1.393480E-01 | -8.863357E-02 | 6.530040E-02 | -3.276549E-02 |
| 172 | -3.639563E-01 | -8.629057E-02 | 3.009457E-02 | -9.913699E-03 |
| Surface # | A10 | A12 | A14 | A16 |
| 111 | 2.242096E-02 | -1.066366E-02 | 0.000000E+00 | 0.000000E+00 |
| 112 | 3.856587E-03 | -8.410536E-03 | 0.000000E+00 | 0.000000E+00 |
| 121 | 3.058735E-02 | -1.199924E-02 | 0.000000E+00 | 0.000000E+00 |
| 122 | -1.768484E-02 | 4.492056E-03 | 0.000000E+00 | 0.000000E+00 |
| 131 | -2.485621E-02 | 9.803767E-03 | 0.000000E+00 | 0.000000E+00 |
| 132 | -4.783788E-02 | 1.961017E-02 | 0.000000E+00 | 0.000000E+00 |
| 141 | -1.595477E-02 | 5.312599E-03 | 0.000000E+00 | 0.000000E+00 |
| 142 | -1.484213E-02 | 3.688454E-03 | 0.000000E+00 | 0.000000E+00 |
| 151 | -8.156326E-04 | -1.129545E-03 | 0.000000E+00 | 0.000000E+00 |
| 152 | -5.876159E-02 | 5.760396E-03 | 0.000000E+00 | 0.000000E+00 |
| 161 | -4.455130E-02 | 1.357236E-02 | -3.027389E-03 | 3.183377E-04 |
| 162 | -2.352540E-03 | 9.025858E-04 | -9.682788E-05 | 1.815010E-06 |
| 171 | 1.339666E-02 | -3.219704E-03 | 3.910191E-04 | -1.843519E-05 |
| 172 | 2.543676E-03 | -4.248218E-04 | 3.846829E-05 | -1.452323E-06 |

FIG. 9

| EFL (Effective focal length) = 4.371 mm, HFOV (Half field of view) = 36.594deg., TTL = 5.529 mm, Image height = 3.33mm, Fno = 2.0 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 200 | Aperture stop | ∞ | -0.2766 | | | | |
| 211 | 1st lens element | 1.8579 | 0.6600 | 1.545 | 55.913 | 3.426 | plastic |
| 212 | | 198.8674 | 0.1428 | | | | |
| 221 | 2nd lens element | -13.0278 | 0.2211 | 1.661 | 20.401 | -8.171 | plastic |
| 222 | | 9.4180 | 0.4034 | | | | |
| 231 | 3rd lens element | 8.2872 | 0.2598 | 1.661 | 20.401 | 13.772 | plastic |
| 232 | | 84.3965 | 0.2408 | | | | |
| 241 | 4th lens element | -2.0457 | 0.3785 | 1.535 | 55.690 | -4.958 | plastic |
| 242 | | -9.4254 | 0.0552 | | | | |
| 251 | 5th lens element | 2.7387 | 0.5572 | 1.535 | 55.690 | 2.596 | plastic |
| 252 | | -2.6341 | 0.1039 | | | | |
| 261 | 6th lens element | -2.6382 | 0.4337 | 1.661 | 20.401 | 34.408 | plastic |
| 262 | | -2.5215 | 0.6600 | | | | |
| 271 | 7th lens element | -2.5819 | 0.2200 | 1.661 | 20.401 | -2.446 | plastic |
| 272 | | 4.5724 | 0.2464 | | | | |
| 281 | IR cut filter | ∞ | 0.2100 | 1.517 | 64.167 | | |
| 282 | | ∞ | 0.2891 | | | | |
| 290 | Image plane | ∞ | | | | | |

FIG. 12

| Aspherical parameters | | | | |
|---|---|---|---|---|
| Surface # | K | A4 | A6 | A8 |
| 211 | 0.000000E+00 | 1.355743E-03 | 9.323155E-03 | -1.532855E-02 |
| 212 | 0.000000E+00 | -9.953073E-03 | 2.457121E-02 | -2.288741E-02 |
| 221 | 0.000000E+00 | -2.739486E-02 | 6.993003E-02 | -5.671255E-02 |
| 222 | 0.000000E+00 | -3.660366E-02 | 5.347946E-02 | -3.195507E-02 |
| 231 | 0.000000E+00 | -9.872419E-02 | -6.693018E-02 | 5.578316E-02 |
| 232 | 0.000000E+00 | 8.120816E-03 | -1.087799E-01 | 8.551128E-02 |
| 241 | 0.000000E+00 | 1.381984E-01 | -8.337494E-02 | 3.570350E-02 |
| 242 | 0.000000E+00 | -1.407001E-01 | 5.378928E-02 | 1.996471E-03 |
| 251 | 0.000000E+00 | -1.283194E-01 | -6.843576E-02 | 2.478229E-02 |
| 252 | 0.000000E+00 | 3.121700E-01 | -4.204346E-01 | 2.222681E-01 |
| 261 | -1.717739E+01 | 1.285030E-01 | -1.603568E-01 | 1.015104E-01 |
| 262 | 9.789306E-01 | 5.882267E-03 | 2.163708E-02 | -3.808844E-03 |
| 271 | 6.509893E-02 | -8.058097E-02 | 6.503806E-02 | -3.239003E-02 |
| 272 | 2.687646E+00 | -7.771426E-02 | 3.034253E-02 | -1.063584E-02 |
| Surface # | A10 | A12 | A14 | A16 |
| 211 | 1.477641E-02 | -5.635456E-03 | 0.000000E+00 | 0.000000E+00 |
| 212 | 1.008610E-02 | -2.107383E-03 | 0.000000E+00 | 0.000000E+00 |
| 221 | 2.264148E-02 | -6.462992E-04 | 0.000000E+00 | 0.000000E+00 |
| 222 | 5.592757E-03 | 3.187243E-03 | 0.000000E+00 | 0.000000E+00 |
| 231 | -4.661311E-02 | 1.766672E-02 | 0.000000E+00 | 0.000000E+00 |
| 232 | -5.018590E-02 | 1.665564E-02 | 0.000000E+00 | 0.000000E+00 |
| 241 | -1.762041E-02 | 4.475516E-03 | 0.000000E+00 | 0.000000E+00 |
| 242 | -1.720225E-02 | 3.909846E-03 | 0.000000E+00 | 0.000000E+00 |
| 251 | 1.095580E-03 | -6.648709E-04 | 0.000000E+00 | 0.000000E+00 |
| 252 | -5.811493E-02 | 6.577158E-03 | 0.000000E+00 | 0.000000E+00 |
| 261 | -4.321128E-02 | 1.287551E-02 | -3.213936E-03 | 3.652285E-04 |
| 262 | -2.326900E-03 | 9.058950E-04 | -9.762854E-05 | 5.756353E-07 |
| 271 | 1.341167E-02 | -3.222540E-03 | 3.905432E-04 | -1.849690E-05 |
| 272 | 2.611884E-03 | -4.184349E-04 | 3.846237E-05 | -1.509104E-06 |

FIG. 13

| EFL (Effective focal length) = 4.095 mm, HFOV (Half field of view) = 38.391deg., TTL = 5.330 mm, Image height = 3.33mm, Fno = 2.0 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 300 | Aperture stop | ∞ | -0.2766 | | | | |
| 311 | 1st lens element | 1.8579 | 0.6600 | 1.545 | 55.913 | 3.426 | plastic |
| 312 | | 198.8674 | 0.1428 | | | | |
| 321 | 2nd lens element | -13.0278 | 0.2211 | 1.661 | 20.401 | -8.171 | plastic |
| 322 | | 9.4180 | 0.4034 | | | | |
| 331 | 3rd lens element | 8.2872 | 0.2598 | 1.661 | 20.401 | 13.772 | plastic |
| 332 | | 84.3965 | 0.2408 | | | | |
| 341 | 4th lens element | -2.0457 | 0.3785 | 1.535 | 55.690 | -4.958 | plastic |
| 342 | | -9.4254 | 0.0552 | | | | |
| 351 | 5th lens element | 2.7387 | 0.5572 | 1.535 | 55.690 | 2.596 | plastic |
| 352 | | -2.6341 | 0.1039 | | | | |
| 361 | 6th lens element | -2.6382 | 0.4337 | 1.661 | 20.401 | 34.408 | plastic |
| 362 | | -2.5215 | 0.6600 | | | | |
| 371 | 7th lens element | -2.5819 | 0.2200 | 1.661 | 20.401 | -2.446 | plastic |
| 372 | | 4.5724 | 0.2464 | | | | |
| 381 | IR cut filter | ∞ | 0.2100 | 1.517 | 64.167 | | |
| 382 | | ∞ | 0.2891 | | | | |
| 390 | Image plane | ∞ | | | | | |

FIG. 16

| Aspherical parameters | | | | |
|---|---|---|---|---|
| Surface # | K | A4 | A6 | A8 |
| 311 | 0.000000E+00 | 3.983416E-04 | 1.122598E-02 | -2.098836E-02 |
| 312 | 0.000000E+00 | -6.626425E-03 | 1.828555E-02 | -1.859388E-02 |
| 321 | 0.000000E+00 | -2.696544E-02 | 7.201322E-02 | -6.732826E-02 |
| 322 | 0.000000E+00 | -4.624794E-02 | 3.798716E-02 | -1.886841E-02 |
| 331 | 0.000000E+00 | -1.088711E-01 | -9.718704E-02 | 5.940452E-02 |
| 332 | 0.000000E+00 | 1.114124E-02 | -1.072343E-01 | 8.871299E-02 |
| 341 | 0.000000E+00 | 2.132624E-01 | -8.673337E-02 | 3.418032E-02 |
| 342 | 0.000000E+00 | -1.073075E-01 | 6.005347E-02 | 8.823032E-03 |
| 351 | 0.000000E+00 | -1.500728E-01 | -4.809184E-02 | 2.996572E-02 |
| 352 | 0.000000E+00 | 3.541875E-01 | -4.233873E-01 | 2.215782E-01 |
| 361 | -1.016117E+01 | 1.524129E-01 | -1.606131E-01 | 9.749250E-02 |
| 362 | -1.246082E-01 | 3.884662E-04 | 3.193946E-02 | -4.858175E-03 |
| 371 | -1.338149E-04 | -8.448595E-02 | 6.626213E-02 | -3.260663E-02 |
| 372 | 7.483387E-03 | -7.818537E-02 | 2.920271E-02 | -1.008486E-02 |
| Surface # | A10 | A12 | A14 | A16 |
| 311 | 2.068795E-02 | -8.245378E-03 | 0.000000E+00 | 0.000000E+00 |
| 312 | 1.069017E-02 | -4.477501E-03 | 0.000000E+00 | 0.000000E+00 |
| 321 | 3.090560E-02 | -4.997153E-03 | 0.000000E+00 | 0.000000E+00 |
| 322 | -1.316589E-02 | 5.039399E-03 | 0.000000E+00 | 0.000000E+00 |
| 331 | -3.231035E-02 | 1.406674E-02 | 0.000000E+00 | 0.000000E+00 |
| 332 | -4.903738E-02 | 1.840411E-02 | 0.000000E+00 | 0.000000E+00 |
| 341 | -1.729029E-02 | 3.484006E-03 | 0.000000E+00 | 0.000000E+00 |
| 342 | -1.568923E-02 | 2.990159E-03 | 0.000000E+00 | 0.000000E+00 |
| 351 | 1.788943E-03 | -1.114869E-03 | 0.000000E+00 | 0.000000E+00 |
| 352 | -5.941924E-02 | 6.796297E-03 | 0.000000E+00 | 0.000000E+00 |
| 361 | -4.298318E-02 | 1.366075E-02 | -3.103361E-03 | 3.022636E-04 |
| 362 | -2.477570E-03 | 8.980536E-04 | -9.529674E-05 | 2.228026E-06 |
| 371 | 1.341087E-02 | -3.219047E-03 | 3.906891E-04 | -1.864271E-05 |
| 372 | 2.553406E-03 | -4.220580E-04 | 3.869146E-05 | -1.454958E-06 |

FIG. 17

| EFL (Effective focal length) = 4.053 mm, HFOV (Half field of view) = 38.682deg., TTL = 5.234 mm, Image height = 3.33mm, Fno = 2.0 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 400 | Aperture stop | ∞ | -0.2766 | | | | |
| 411 | 1st lens element | 1.8579 | 0.6600 | 1.545 | 55.913 | 3.426 | plastic |
| 412 | | 198.8674 | 0.1428 | | | | |
| 421 | 2nd lens element | -13.0278 | 0.2211 | 1.661 | 20.401 | -8.171 | plastic |
| 422 | | 9.4180 | 0.4034 | | | | |
| 431 | 3rd lens element | 8.2872 | 0.2598 | 1.661 | 20.401 | 13.772 | plastic |
| 432 | | 84.3965 | 0.2408 | | | | |
| 441 | 4th lens element | -2.0457 | 0.3785 | 1.535 | 55.690 | -4.958 | plastic |
| 442 | | -9.4254 | 0.0552 | | | | |
| 451 | 5th lens element | 2.7387 | 0.5572 | 1.535 | 55.690 | 2.596 | plastic |
| 452 | | -2.6341 | 0.1039 | | | | |
| 461 | 6th lens element | -2.6382 | 0.4337 | 1.661 | 20.401 | 34.408 | plastic |
| 462 | | -2.5215 | 0.6600 | | | | |
| 471 | 7th lens element | -2.5819 | 0.2200 | 1.661 | 20.401 | -2.446 | plastic |
| 472 | | 4.5724 | 0.2464 | | | | |
| 481 | IR cut filter | ∞ | 0.2100 | 1.517 | 64.167 | | |
| 482 | | ∞ | 0.2891 | | | | |
| 490 | Image plane | ∞ | | | | | |

FIG. 20

| Aspherical parameters | | | | |
|---|---|---|---|---|
| Surface # | K | A4 | A6 | A8 |
| 411 | 0.000000E+00 | -3.059350E-04 | 1.029776E-02 | -2.070345E-02 |
| 412 | 0.000000E+00 | -2.964705E-03 | 1.391805E-02 | -1.654599E-02 |
| 421 | 0.000000E+00 | -2.313565E-02 | 6.148733E-02 | -7.020134E-02 |
| 422 | 0.000000E+00 | -6.174588E-02 | 3.064337E-02 | -1.796767E-02 |
| 431 | 0.000000E+00 | -1.252985E-01 | -1.026195E-01 | 6.877068E-02 |
| 432 | 0.000000E+00 | 3.526904E-02 | -1.090390E-01 | 9.203309E-02 |
| 441 | 0.000000E+00 | 2.380267E-01 | -1.039593E-01 | 2.734132E-02 |
| 442 | 0.000000E+00 | -1.256790E-01 | 4.482773E-02 | 5.606208E-03 |
| 451 | 0.000000E+00 | -1.315614E-01 | -4.388305E-02 | 2.715457E-02 |
| 452 | 0.000000E+00 | 3.493546E-01 | -4.141762E-01 | 2.255506E-01 |
| 461 | -1.256720E+01 | 1.347296E-01 | -1.519996E-01 | 9.817660E-02 |
| 462 | 5.504679E-02 | -6.284427E-03 | 3.228070E-02 | -4.783890E-03 |
| 471 | 1.064650E-01 | -7.998842E-02 | 6.565354E-02 | -3.264998E-02 |
| 472 | 1.752167E-01 | -7.815435E-02 | 2.872489E-02 | -1.003983E-02 |
| Surface # | A10 | A12 | A14 | A16 |
| 411 | 2.112226E-02 | -9.591133E-03 | 0.000000E+00 | 0.000000E+00 |
| 412 | 6.513951E-03 | -6.323781E-04 | 0.000000E+00 | 0.000000E+00 |
| 421 | 3.866316E-02 | -4.458688E-03 | 0.000000E+00 | 0.000000E+00 |
| 422 | -1.165121E-02 | 1.027605E-02 | 0.000000E+00 | 0.000000E+00 |
| 431 | -2.214236E-02 | 1.249976E-02 | 0.000000E+00 | 0.000000E+00 |
| 432 | -4.798925E-02 | 1.774305E-02 | 0.000000E+00 | 0.000000E+00 |
| 441 | -1.621129E-02 | 5.767030E-03 | 0.000000E+00 | 0.000000E+00 |
| 442 | -1.597235E-02 | 2.754940E-03 | 0.000000E+00 | 0.000000E+00 |
| 451 | -1.404496E-03 | -3.641136E-03 | 0.000000E+00 | 0.000000E+00 |
| 452 | -5.952339E-02 | 5.772989E-03 | 0.000000E+00 | 0.000000E+00 |
| 461 | -4.329694E-02 | 1.356714E-02 | -3.114925E-03 | 2.985651E-04 |
| 462 | -2.488457E-03 | 8.953523E-04 | -9.521621E-05 | 2.441730E-06 |
| 471 | 1.340492E-02 | -3.219771E-03 | 3.908637E-04 | -1.856712E-05 |
| 472 | 2.556574E-03 | -4.223774E-04 | 3.868584E-05 | -1.458870E-06 |

FIG. 21

| EFL（Effective focal length）= 4.293 mm，HFOV（Half field of view）= 37.091deg.，TTL = 5.524 mm，Image height = 3.33mm，Fno = 2.0 | | | | | | | |
|---|---|---|---|---|---|---|---|
| Surface # | | Radius（mm） | Thickness（mm） | Refractive index | Abbe number | Focus（mm） | Material |
| - | Object | ∞ | ∞ | | | | |
| 500 | Aperture stop | ∞ | -0.2766 | | | | |
| 511 | 1st lens element | 1.8579 | 0.6600 | 1.545 | 55.913 | 3.426 | plastic |
| 512 | | 198.8674 | 0.1428 | | | | |
| 521 | 2nd lens element | -13.0278 | 0.2211 | 1.661 | 20.401 | -8.171 | plastic |
| 522 | | 9.4180 | 0.4034 | | | | |
| 531 | 3rd lens element | 8.2872 | 0.2598 | 1.661 | 20.401 | 13.772 | plastic |
| 532 | | 84.3965 | 0.2408 | | | | |
| 541 | 4th lens element | -2.0457 | 0.3785 | 1.535 | 55.690 | -4.958 | plastic |
| 542 | | -9.4254 | 0.0552 | | | | |
| 551 | 5th lens element | 2.7387 | 0.5572 | 1.535 | 55.690 | 2.596 | plastic |
| 552 | | -2.6341 | 0.1039 | | | | |
| 561 | 6th lens element | -2.6382 | 0.4337 | 1.661 | 20.401 | 34.408 | plastic |
| 562 | | -2.5215 | 0.6600 | | | | |
| 571 | 7th lens element | -2.5819 | 0.2200 | 1.661 | 20.401 | -2.446 | plastic |
| 572 | | 4.5724 | 0.2464 | | | | |
| 581 | IR cut filter | ∞ | 0.2100 | 1.517 | 64.167 | | |
| 582 | | ∞ | 0.2891 | | | | |
| 590 | Image plane | ∞ | | | | | |

FIG. 24

| Aspherical parameters | | | | |
|---|---|---|---|---|
| Surface # | K | A4 | A6 | A8 |
| 511 | 0.000000E+00 | 1.584820E-03 | 1.025758E-02 | -1.805192E-02 |
| 512 | 0.000000E+00 | -1.081910E-02 | 2.876707E-02 | -2.812872E-02 |
| 521 | 0.000000E+00 | -2.288780E-02 | 7.069839E-02 | -6.093813E-02 |
| 522 | 0.000000E+00 | -2.388882E-02 | 5.142612E-02 | -2.657063E-02 |
| 531 | 0.000000E+00 | -1.179223E-01 | -8.150873E-02 | 6.542976E-02 |
| 532 | 0.000000E+00 | -4.748772E-02 | -9.454427E-02 | 8.068856E-02 |
| 541 | 0.000000E+00 | 1.756541E-01 | -8.007527E-02 | 3.159702E-02 |
| 542 | 0.000000E+00 | -8.533239E-02 | 5.990807E-02 | 1.016533E-02 |
| 551 | 0.000000E+00 | -1.269081E-01 | -1.371232E-02 | 2.190165E-02 |
| 552 | 0.000000E+00 | 3.314663E-01 | -4.049991E-01 | 2.214510E-01 |
| 561 | -1.141629E+01 | 1.355281E-01 | -1.780479E-01 | 1.038689E-01 |
| 562 | 2.846615E-01 | 1.742631E-02 | 8.883013E-03 | -4.384134E-03 |
| 571 | 2.180353E-02 | -1.202227E-01 | 6.653613E-02 | -3.224526E-02 |
| 572 | -1.967012E+00 | -8.631320E-02 | 2.984712E-02 | -9.826391E-03 |
| Surface # | A10 | A12 | A14 | A16 |
| 511 | 1.813376E-02 | -7.503773E-03 | 0.000000E+00 | 0.000000E+00 |
| 512 | 1.247415E-02 | -3.559673E-03 | 0.000000E+00 | 0.000000E+00 |
| 521 | 2.480400E-02 | -1.138468E-03 | 0.000000E+00 | 0.000000E+00 |
| 522 | -2.799939E-04 | 6.737703E-03 | 0.000000E+00 | 0.000000E+00 |
| 531 | -5.277563E-02 | 1.789228E-02 | 0.000000E+00 | 0.000000E+00 |
| 532 | -5.141541E-02 | 1.697464E-02 | 0.000000E+00 | 0.000000E+00 |
| 541 | -1.855084E-02 | 4.836251E-03 | 0.000000E+00 | 0.000000E+00 |
| 542 | -1.862327E-02 | 2.596234E-03 | 0.000000E+00 | 0.000000E+00 |
| 551 | 2.573970E-03 | -3.768369E-03 | 0.000000E+00 | 0.000000E+00 |
| 552 | -5.971493E-02 | 6.175284E-03 | 0.000000E+00 | 0.000000E+00 |
| 561 | -4.202560E-02 | 1.281257E-02 | -3.303960E-03 | 4.014664E-04 |
| 562 | -1.974092E-03 | 9.699170E-04 | -9.411123E-05 | -4.698273E-07 |
| 571 | 1.346961E-02 | -3.216810E-03 | 3.898226E-04 | -1.894016E-05 |
| 572 | 2.547669E-03 | -4.243839E-04 | 3.851680E-05 | -1.423747E-06 |

FIG. 25

| EFL (Effective focal length) = 4.206 mm, HFOV (Half field of view) = 37.642deg., TTL = 5.508 mm, Image height = 3.33mm, Fno = 2.0 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 600 | Aperture stop | ∞ | -0.2766 | | | | |
| 611 | 1st lens element | 1.8579 | 0.6600 | 1.545 | 55.913 | 3.426 | plastic |
| 612 | | 198.8674 | 0.1428 | | | | |
| 621 | 2nd lens element | -13.0278 | 0.2211 | 1.661 | 20.401 | -8.171 | plastic |
| 622 | | 9.4180 | 0.4034 | | | | |
| 631 | 3rd lens element | 8.2872 | 0.2598 | 1.661 | 20.401 | 13.772 | plastic |
| 632 | | 84.3965 | 0.2408 | | | | |
| 641 | 4th lens element | -2.0457 | 0.3785 | 1.535 | 55.690 | -4.958 | plastic |
| 642 | | -9.4254 | 0.0552 | | | | |
| 651 | 5th lens element | 2.7387 | 0.5572 | 1.535 | 55.690 | 2.596 | plastic |
| 652 | | -2.6341 | 0.1039 | | | | |
| 661 | 6th lens element | -2.6382 | 0.4337 | 1.661 | 20.401 | 34.408 | plastic |
| 662 | | -2.5215 | 0.6600 | | | | |
| 671 | 7th lens element | -2.5819 | 0.2200 | 1.661 | 20.401 | -2.446 | plastic |
| 672 | | 4.5724 | 0.2464 | | | | |
| 681 | IR cut filter | ∞ | 0.2100 | 1.517 | 64.167 | | |
| 682 | | ∞ | 0.2891 | | | | |
| 690 | Image plane | ∞ | | | | | |

FIG. 28

| Aspherical parameters | | | | |
|---|---|---|---|---|
| Surface # | K | A4 | A6 | A8 |
| 611 | 0.000000E+00 | 2.238317E-03 | 1.238104E-02 | -1.931088E-02 |
| 612 | 0.000000E+00 | -7.393749E-03 | 2.164463E-02 | -2.199764E-02 |
| 621 | 0.000000E+00 | -2.547904E-02 | 6.884271E-02 | -6.198935E-02 |
| 622 | 0.000000E+00 | -3.476645E-02 | 4.789907E-02 | -2.295368E-02 |
| 631 | 0.000000E+00 | -1.024876E-01 | -6.949689E-02 | 5.199789E-02 |
| 632 | 0.000000E+00 | -5.475548E-03 | -1.031529E-01 | 8.515578E-02 |
| 641 | 0.000000E+00 | 1.634786E-01 | -8.700941E-02 | 4.018675E-02 |
| 642 | 0.000000E+00 | -1.350770E-01 | 6.194418E-02 | 1.330818E-02 |
| 651 | 0.000000E+00 | -1.628880E-01 | -4.273381E-02 | 3.100366E-02 |
| 652 | 0.000000E+00 | 3.460772E-01 | -4.195403E-01 | 2.215473E-01 |
| 661 | -1.263517E+01 | 1.473512E-01 | -1.655111E-01 | 9.984127E-02 |
| 662 | 2.452217E-01 | -1.471795E-03 | 2.850149E-02 | -4.482245E-03 |
| 671 | -2.626904E-02 | -8.987216E-02 | 6.601351E-02 | -3.255020E-02 |
| 672 | 1.841676E+00 | -7.880819E-02 | 2.898175E-02 | -1.015591E-02 |
| Surface # | A10 | A12 | A14 | A16 |
| 611 | 1.867254E-02 | -6.889984E-03 | 0.000000E+00 | 0.000000E+00 |
| 612 | 1.263383E-02 | -4.484824E-03 | 0.000000E+00 | 0.000000E+00 |
| 621 | 2.934713E-02 | -3.867755E-03 | 0.000000E+00 | 0.000000E+00 |
| 622 | -3.599108E-03 | 6.252354E-03 | 0.000000E+00 | 0.000000E+00 |
| 631 | -4.351180E-02 | 1.633791E-02 | 0.000000E+00 | 0.000000E+00 |
| 632 | -5.201390E-02 | 1.662413E-02 | 0.000000E+00 | 0.000000E+00 |
| 641 | -1.532131E-02 | 1.469345E-03 | 0.000000E+00 | 0.000000E+00 |
| 642 | -1.533366E-02 | 2.475467E-03 | 0.000000E+00 | 0.000000E+00 |
| 651 | 1.740995E-03 | -1.404796E-03 | 0.000000E+00 | 0.000000E+00 |
| 652 | -5.980934E-02 | 6.645801E-03 | 0.000000E+00 | 0.000000E+00 |
| 661 | -4.263199E-02 | 1.335506E-02 | -3.176393E-03 | 3.391783E-04 |
| 662 | -2.421824E-03 | 8.975583E-04 | -9.618282E-05 | 1.974485E-06 |
| 671 | 1.343217E-02 | -3.217252E-03 | 3.906701E-04 | -1.873255E-05 |
| 672 | 2.569120E-03 | -4.214421E-04 | 3.860536E-05 | -1.468621E-06 |

FIG. 29

| EFL (Effective focal length) = 4.076 mm, HFOV (Half field of view) = 38.524deg., TTL = 5.275 mm, Image height = 3.33mm, Fno = 2.0 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 700 | Aperture stop | ∞ | -0.2766 | | | | |
| 711 | 1st lens element | 1.8579 | 0.6600 | 1.545 | 55.913 | 3.426 | plastic |
| 712 | | 198.8674 | 0.1428 | | | | |
| 721 | 2nd lens element | -13.0278 | 0.2211 | 1.661 | 20.401 | -8.171 | plastic |
| 722 | | 9.4180 | 0.4034 | | | | |
| 731 | 3rd lens element | 8.2872 | 0.2598 | 1.661 | 20.401 | 13.772 | plastic |
| 732 | | 84.3965 | 0.2408 | | | | |
| 741 | 4th lens element | -2.0457 | 0.3785 | 1.535 | 55.690 | -4.958 | plastic |
| 742 | | -9.4254 | 0.0552 | | | | |
| 751 | 5th lens element | 2.7387 | 0.5572 | 1.535 | 55.690 | 2.596 | plastic |
| 752 | | -2.6341 | 0.1039 | | | | |
| 761 | 6th lens element | -2.6382 | 0.4337 | 1.661 | 20.401 | 34.408 | plastic |
| 762 | | -2.5215 | 0.6600 | | | | |
| 771 | 7th lens element | -2.5819 | 0.2200 | 1.661 | 20.401 | -2.446 | plastic |
| 772 | | 4.5724 | 0.2464 | | | | |
| 781 | IR cut filter | ∞ | 0.2100 | 1.517 | 64.167 | | |
| 782 | | ∞ | 0.2891 | | | | |
| 790 | Image plane | ∞ | | | | | |

FIG. 32

| Aspherical parameters | | | | |
|---|---|---|---|---|
| Surface # | K | A4 | A6 | A8 |
| 711 | 0.000000E+00 | 5.090188E-04 | 1.057781E-02 | -2.028545E-02 |
| 712 | 0.000000E+00 | -6.580585E-03 | 1.555223E-02 | -1.778435E-02 |
| 721 | 0.000000E+00 | -2.191645E-02 | 7.086416E-02 | -6.846059E-02 |
| 722 | 0.000000E+00 | -4.503871E-02 | 4.070187E-02 | -2.134891E-02 |
| 731 | 0.000000E+00 | -1.129231E-01 | -9.961475E-02 | 5.806026E-02 |
| 732 | 0.000000E+00 | 1.583453E-02 | -1.090409E-01 | 8.984123E-02 |
| 741 | 0.000000E+00 | 2.217739E-01 | -8.928943E-02 | 3.031760E-02 |
| 742 | 0.000000E+00 | -1.038176E-01 | 5.513255E-02 | 6.438165E-03 |
| 751 | 0.000000E+00 | -1.448341E-01 | -5.462723E-02 | 2.870938E-02 |
| 752 | 0.000000E+00 | 3.506165E-01 | -4.253324E-01 | 2.213000E-01 |
| 761 | -9.238745E+00 | 1.568070E-01 | -1.601968E-01 | 9.743005E-02 |
| 762 | -2.123035E-01 | 5.084952E-04 | 3.219345E-02 | -4.937177E-03 |
| 771 | -2.393140E-02 | -8.469243E-02 | 6.630566E-02 | -3.259241E-02 |
| 772 | -1.385802E+00 | -7.508955E-02 | 2.880914E-02 | -1.000192E-02 |
| Surface # | A10 | A12 | A14 | A16 |
| 711 | 2.067511E-02 | -8.468934E-03 | 0.000000E+00 | 0.000000E+00 |
| 712 | 1.323588E-02 | -6.783363E-03 | 0.000000E+00 | 0.000000E+00 |
| 721 | 3.347133E-02 | -7.683858E-03 | 0.000000E+00 | 0.000000E+00 |
| 722 | -1.209202E-02 | 3.385294E-03 | 0.000000E+00 | 0.000000E+00 |
| 731 | -2.094649E-02 | 7.589759E-03 | 0.000000E+00 | 0.000000E+00 |
| 732 | -4.772559E-02 | 1.850519E-02 | 0.000000E+00 | 0.000000E+00 |
| 741 | -1.769903E-02 | 4.970155E-03 | 0.000000E+00 | 0.000000E+00 |
| 742 | -1.582639E-02 | 3.524029E-03 | 0.000000E+00 | 0.000000E+00 |
| 751 | 1.849336E-03 | -8.269685E-04 | 0.000000E+00 | 0.000000E+00 |
| 752 | -5.910129E-02 | 6.892524E-03 | 0.000000E+00 | 0.000000E+00 |
| 761 | -4.311612E-02 | 1.368082E-02 | -3.091026E-03 | 3.027171E-04 |
| 762 | -2.481806E-03 | 8.982090E-04 | -9.528282E-05 | 2.211209E-06 |
| 771 | 1.341237E-02 | -3.220544E-03 | 3.906228E-04 | -1.863584E-05 |
| 772 | 2.547561E-03 | -4.222461E-04 | 3.878475E-05 | -1.461376E-06 |

FIG. 33

| EFL（Effective focal length）= 4.457 mm，HFOV（Half field of view）= 36.085deg.，TTL = 5.596 mm，Image height = 3.33mm，Fno = 2.0 | | | | | | | |
|---|---|---|---|---|---|---|---|
| Surface # | | Radius（mm） | Thickness（mm） | Refractive index | Abbe number | Focus（mm） | Material |
| - | Object | ∞ | ∞ | | | | |
| 800 | Aperture stop | ∞ | -0.2766 | | | | |
| 811 | 1st lens element | 1.8579 | 0.6600 | 1.545 | 55.913 | 3.426 | plastic |
| 812 | | 198.8674 | 0.1428 | | | | |
| 821 | 2nd lens element | -13.0278 | 0.2211 | 1.661 | 20.401 | -8.171 | plastic |
| 822 | | 9.4180 | 0.4034 | | | | |
| 831 | 3rd lens element | 8.2872 | 0.2598 | 1.661 | 20.401 | 13.772 | plastic |
| 832 | | 84.3965 | 0.2408 | | | | |
| 841 | 4th lens element | -2.0457 | 0.3785 | 1.535 | 55.690 | -4.958 | plastic |
| 842 | | -9.4254 | 0.0552 | | | | |
| 851 | 5th lens element | 2.7387 | 0.5572 | 1.535 | 55.690 | 2.596 | plastic |
| 852 | | -2.6341 | 0.1039 | | | | |
| 861 | 6th lens element | -2.6382 | 0.4337 | 1.661 | 20.401 | 34.408 | plastic |
| 862 | | -2.5215 | 0.6600 | | | | |
| 871 | 7th lens element | -2.5819 | 0.2200 | 1.661 | 20.401 | -2.446 | plastic |
| 872 | | 4.5724 | 0.2464 | | | | |
| 881 | IR cut filter | ∞ | 0.2100 | 1.517 | 64.167 | | |
| 882 | | ∞ | 0.2891 | | | | |
| 890 | Image plane | ∞ | | | | | |

FIG. 36

| Aspherical parameters | | | | |
|---|---|---|---|---|
| Surface # | K | A4 | A6 | A8 |
| 811 | 0.000000E+00 | 5.824427E-04 | 1.031860E-02 | -1.934156E-02 |
| 812 | 0.000000E+00 | -1.021389E-02 | 2.450982E-02 | -2.620727E-02 |
| 821 | 0.000000E+00 | -2.954385E-02 | 6.796936E-02 | -5.494046E-02 |
| 822 | 0.000000E+00 | -2.961086E-02 | 5.296037E-02 | -2.393705E-02 |
| 831 | 0.000000E+00 | -9.829126E-02 | -8.491941E-02 | 6.471208E-02 |
| 832 | 0.000000E+00 | -8.089878E-03 | -1.154994E-01 | 8.519671E-02 |
| 841 | 0.000000E+00 | 1.401594E-01 | -7.935229E-02 | 3.141891E-02 |
| 842 | 0.000000E+00 | -1.269134E-01 | 4.573978E-02 | 7.894347E-03 |
| 851 | 0.000000E+00 | -1.474718E-01 | -3.912438E-02 | 3.154961E-02 |
| 852 | 0.000000E+00 | 3.364480E-01 | -4.065360E-01 | 2.200807E-01 |
| 861 | -9.556503E+00 | 1.573446E-01 | -1.745126E-01 | 1.032163E-01 |
| 862 | 7.082333E-01 | -2.059482E-03 | 2.915122E-02 | -4.834205E-03 |
| 871 | 1.265323E-01 | -8.816351E-02 | 6.495466E-02 | -3.253429E-02 |
| 872 | 8.837062E-01 | -7.872472E-02 | 2.967989E-02 | -1.033195E-02 |
| Surface # | A10 | A12 | A14 | A16 |
| 811 | 1.817520E-02 | -7.295214E-03 | 0.000000E+00 | 0.000000E+00 |
| 812 | 1.388250E-02 | -4.327177E-03 | 0.000000E+00 | 0.000000E+00 |
| 821 | 2.675716E-02 | -3.722450E-03 | 0.000000E+00 | 0.000000E+00 |
| 822 | 4.126776E-03 | 5.329576E-03 | 0.000000E+00 | 0.000000E+00 |
| 831 | -4.446554E-02 | 1.929761E-02 | 0.000000E+00 | 0.000000E+00 |
| 832 | -4.951334E-02 | 1.707299E-02 | 0.000000E+00 | 0.000000E+00 |
| 841 | -1.830972E-02 | 5.116887E-03 | 0.000000E+00 | 0.000000E+00 |
| 842 | -1.580540E-02 | 2.690699E-03 | 0.000000E+00 | 0.000000E+00 |
| 851 | 2.673822E-03 | -4.329574E-03 | 0.000000E+00 | 0.000000E+00 |
| 852 | -5.962744E-02 | 6.373489E-03 | 0.000000E+00 | 0.000000E+00 |
| 861 | -4.191031E-02 | 1.270372E-02 | -3.354135E-03 | 4.304344E-04 |
| 862 | -2.405235E-03 | 9.106551E-04 | -9.525593E-05 | 1.770641E-06 |
| 871 | 1.344658E-02 | -3.214615E-03 | 3.908795E-04 | -1.879818E-05 |
| 872 | 2.575076E-03 | -4.198704E-04 | 3.867078E-05 | -1.478936E-06 |

FIG. 37

| EFL (Effective focal length) = 4.134 mm, HFOV (Half field of view) = 38.164deg., TTL = 5.293 mm, Image height = 3.33mm, Fno = 2.0 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 900 | Aperture stop | ∞ | -0.2766 | | | | |
| 911 | 1st lens element | 1.8579 | 0.6600 | 1.545 | 55.913 | 3.426 | plastic |
| 912 | | 198.8674 | 0.1428 | | | | |
| 921 | 2nd lens element | -13.0278 | 0.2211 | 1.661 | 20.401 | -8.171 | plastic |
| 922 | | 9.4180 | 0.4034 | | | | |
| 931 | 3rd lens element | 8.2872 | 0.2598 | 1.661 | 20.401 | 13.772 | plastic |
| 932 | | 84.3965 | 0.2408 | | | | |
| 941 | 4th lens element | -2.0457 | 0.3785 | 1.535 | 55.690 | -4.958 | plastic |
| 942 | | -9.4254 | 0.0552 | | | | |
| 951 | 5th lens element | 2.7387 | 0.5572 | 1.535 | 55.690 | 2.596 | plastic |
| 952 | | -2.6341 | 0.1039 | | | | |
| 961 | 6th lens element | -2.6382 | 0.4337 | 1.661 | 20.401 | 34.408 | plastic |
| 962 | | -2.5215 | 0.6600 | | | | |
| 971 | 7th lens element | -2.5819 | 0.2200 | 1.661 | 20.401 | -2.446 | plastic |
| 972 | | 4.5724 | 0.2464 | | | | |
| 981 | IR cut filter | ∞ | 0.2100 | 1.517 | 64.167 | | |
| 982 | | ∞ | 0.2891 | | | | |
| 990 | Image plane | ∞ | | | | | |

FIG. 40

| Aspherical parameters | | | | |
|---|---|---|---|---|
| Surface # | K | A4 | A6 | A8 |
| 911 | 0.000000E+00 | -1.573834E-03 | 9.056309E-03 | -2.051818E-02 |
| 912 | 0.000000E+00 | 1.586827E-03 | 9.366910E-03 | -1.173455E-02 |
| 921 | 0.000000E+00 | -6.023437E-03 | 6.550290E-02 | -7.667240E-02 |
| 922 | 0.000000E+00 | -4.783125E-02 | 4.079088E-02 | -2.320246E-02 |
| 931 | 0.000000E+00 | -1.063465E-01 | -9.892053E-02 | 6.457972E-02 |
| 932 | 0.000000E+00 | 3.326895E-02 | -1.117250E-01 | 9.010609E-02 |
| 941 | 0.000000E+00 | 2.500625E-01 | -9.983117E-02 | 3.023785E-02 |
| 942 | 0.000000E+00 | -1.062416E-01 | 5.854200E-02 | 8.649142E-03 |
| 951 | 0.000000E+00 | -1.531098E-01 | -4.280140E-02 | 2.967979E-02 |
| 952 | 0.000000E+00 | 3.472767E-01 | -4.278297E-01 | 2.254070E-01 |
| 961 | -1.345191E+01 | 1.329348E-01 | -1.530465E-01 | 9.692124E-02 |
| 962 | -2.090191E-01 | -1.449002E-03 | 3.366623E-02 | -4.865960E-03 |
| 971 | 8.069637E-02 | -8.015500E-02 | 6.621163E-02 | -3.268627E-02 |
| 972 | -6.744048E-02 | -7.749780E-02 | 2.840069E-02 | -9.947214E-03 |
| Surface # | A10 | A12 | A14 | A16 |
| 911 | 2.155467E-02 | -9.615546E-03 | 0.000000E+00 | 0.000000E+00 |
| 912 | 5.972834E-03 | -3.935123E-03 | 0.000000E+00 | 0.000000E+00 |
| 921 | 3.747498E-02 | -8.478189E-03 | 0.000000E+00 | 0.000000E+00 |
| 922 | -2.013256E-02 | 8.431190E-03 | 0.000000E+00 | 0.000000E+00 |
| 931 | -2.274287E-02 | 8.442018E-03 | 0.000000E+00 | 0.000000E+00 |
| 932 | -4.876678E-02 | 1.927750E-02 | 0.000000E+00 | 0.000000E+00 |
| 941 | -1.550561E-02 | 4.648013E-03 | 0.000000E+00 | 0.000000E+00 |
| 942 | -1.491436E-02 | 3.258770E-03 | 0.000000E+00 | 0.000000E+00 |
| 951 | 8.759294E-04 | -8.708174E-04 | 0.000000E+00 | 0.000000E+00 |
| 952 | -5.874848E-02 | 6.230370E-03 | 0.000000E+00 | 0.000000E+00 |
| 961 | -4.336922E-02 | 1.379272E-02 | -3.076019E-03 | 2.854609E-04 |
| 962 | -2.505350E-03 | 8.942617E-04 | -9.543908E-05 | 2.405946E-06 |
| 971 | 1.340110E-02 | -3.219775E-03 | 3.908412E-04 | -1.860279E-05 |
| 972 | 2.550531E-03 | -4.235701E-04 | 3.867427E-05 | -1.439418E-06 |

FIG. 41

| EFL（Effective focal length）= 3.978 mm，HFOV（Half field of view）= 37.521deg.，TTL = 5.222 mm，Image height = 3.33mm，Fno = 2.0 | | | | | | | |
|---|---|---|---|---|---|---|---|
| Surface # | | Radius（mm） | Thickness（mm） | Refractive index | Abbe number | Focus（mm） | Material |
| - | Object | ∞ | ∞ | | | | |
| 10'00 | Aperture stop | ∞ | -0.2766 | | | | |
| 10'11 | 1st lens element | 1.8579 | 0.6600 | 1.545 | 55.913 | 3.426 | plastic |
| 10'12 | | 198.8674 | 0.1428 | | | | |
| 10'21 | 2nd lens element | -13.0278 | 0.2211 | 1.661 | 20.401 | -8.171 | plastic |
| 10'22 | | 9.4180 | 0.4034 | | | | |
| 10'31 | 3rd lens element | 8.2872 | 0.2598 | 1.661 | 20.401 | 13.772 | plastic |
| 10'32 | | 84.3965 | 0.2408 | | | | |
| 10'41 | 4th lens element | -2.0457 | 0.3785 | 1.535 | 55.690 | -4.958 | plastic |
| 10'42 | | -9.4254 | 0.0552 | | | | |
| 10'51 | 5th lens element | 2.7387 | 0.5572 | 1.535 | 55.690 | 2.596 | plastic |
| 10'52 | | -2.6341 | 0.1039 | | | | |
| 10'61 | 6th lens element | -2.6382 | 0.4337 | 1.661 | 20.401 | 34.408 | plastic |
| 10'62 | | -2.5215 | 0.6600 | | | | |
| 10'71 | 7th lens element | -2.5819 | 0.2200 | 1.661 | 20.401 | -2.446 | plastic |
| 10'72 | | 4.5724 | 0.2464 | | | | |
| 10'81 | IR cut filter | ∞ | 0.2100 | 1.517 | 64.167 | | |
| 10'82 | | ∞ | 0.2891 | | | | |
| 10'90 | Image plane | ∞ | | | | | |

FIG. 44

| Aspherical parameters | | | | |
|---|---|---|---|---|
| Surface # | K | A4 | A6 | A8 |
| 10'11 | 0.000000E+00 | -1.487746E-03 | 1.144873E-02 | -1.985204E-02 |
| 10'12 | 0.000000E+00 | 3.024893E-02 | 1.548604E-02 | -1.480438E-02 |
| 10'21 | 0.000000E+00 | 2.765836E-03 | 6.720474E-02 | -8.078324E-02 |
| 10'22 | 0.000000E+00 | -5.737344E-02 | 3.684977E-02 | -2.119694E-02 |
| 10'31 | 0.000000E+00 | -1.058265E-01 | -9.669099E-02 | 6.255862E-02 |
| 10'32 | 0.000000E+00 | 3.736368E-02 | -1.185265E-01 | 8.774614E-02 |
| 10'41 | 0.000000E+00 | 2.441814E-01 | -1.114500E-01 | 2.831525E-02 |
| 10'42 | 0.000000E+00 | -1.185837E-01 | 5.824567E-02 | 8.654626E-03 |
| 10'51 | 0.000000E+00 | -1.241361E-01 | -3.646415E-02 | 3.074171E-02 |
| 10'52 | 0.000000E+00 | 3.536339E-01 | -4.234697E-01 | 2.268066E-01 |
| 10'61 | -4.544786E+01 | 1.314654E-01 | -1.498810E-01 | 9.780318E-02 |
| 10'62 | -5.655853E-02 | -5.709287E-03 | 3.369754E-02 | -4.873909E-03 |
| 10'71 | 4.754449E-02 | -7.922966E-02 | 6.617887E-02 | -3.269305E-02 |
| 10'72 | 1.836843E-01 | -8.084546E-02 | 2.907822E-02 | -9.870046E-03 |
| Surface # | A10 | A12 | A14 | A16 |
| 10'11 | 2.256380E-02 | -8.868084E-03 | 0.000000E+00 | 0.000000E+00 |
| 10'12 | 2.698883E-03 | -3.019008E-03 | 0.000000E+00 | 0.000000E+00 |
| 10'21 | 3.645696E-02 | -9.845380E-03 | 0.000000E+00 | 0.000000E+00 |
| 10'22 | -1.958242E-02 | 9.129644E-03 | 0.000000E+00 | 0.000000E+00 |
| 10'31 | -2.157222E-02 | 8.699083E-03 | 0.000000E+00 | 0.000000E+00 |
| 10'32 | -5.010533E-02 | 1.908371E-02 | 0.000000E+00 | 0.000000E+00 |
| 10'41 | -1.423127E-02 | 5.734338E-03 | 9.906104E-05 | 1.057798E-04 |
| 10'42 | -1.434313E-02 | 3.745237E-03 | -9.852524E-05 | -6.116986E-05 |
| 10'51 | -4.093228E-04 | -1.909580E-03 | 6.641777E-06 | 1.904651E-05 |
| 10'52 | -5.873518E-02 | 5.904741E-03 | -1.458595E-07 | -3.094906E-06 |
| 10'61 | -4.357324E-02 | 1.372547E-02 | -3.056256E-03 | 3.099465E-04 |
| 10'62 | -2.510303E-03 | 8.944631E-04 | -9.513604E-05 | 2.486283E-06 |
| 10'71 | 1.340178E-02 | -3.219989E-03 | 3.907513E-04 | -1.862200E-05 |
| 10'72 | 2.552667E-03 | -4.238520E-04 | 3.862662E-05 | -1.446458E-06 |

FIG. 45

| Embodiment | 1st | 2nd | 3rd | 4th | 5th | 6th | 7th | 8th | 9th | 10th |
|---|---|---|---|---|---|---|---|---|---|---|
| T1 | 0.660 | 0.660 | 0.655 | 0.579 | 0.660 | 0.651 | 0.660 | 0.660 | 0.591 | 0.591 |
| G12 | 0.143 | 0.136 | 0.139 | 0.154 | 0.123 | 0.136 | 0.156 | 0.131 | 0.221 | 0.100 |
| T2 | 0.221 | 0.269 | 0.240 | 0.259 | 0.300 | 0.276 | 0.220 | 0.287 | 0.220 | 0.295 |
| G23 | 0.403 | 0.380 | 0.325 | 0.292 | 0.462 | 0.364 | 0.303 | 0.463 | 0.265 | 0.325 |
| T3 | 0.260 | 0.399 | 0.394 | 0.321 | 0.355 | 0.465 | 0.357 | 0.297 | 0.369 | 0.422 |
| G34 | 0.241 | 0.127 | 0.166 | 0.160 | 0.183 | 0.159 | 0.171 | 0.134 | 0.180 | 0.149 |
| T4 | 0.379 | 0.522 | 0.396 | 0.577 | 0.398 | 0.405 | 0.397 | 0.458 | 0.361 | 0.361 |
| G45 | 0.055 | 0.088 | 0.053 | 0.001 | 0.025 | 0.043 | 0.056 | 0.110 | 0.037 | 0.069 |
| T5 | 0.557 | 0.417 | 0.530 | 0.513 | 0.660 | 0.603 | 0.487 | 0.612 | 0.521 | 0.484 |
| G56 | 0.104 | 0.050 | 0.084 | 0.050 | 0.126 | 0.080 | 0.077 | 0.025 | 0.092 | 0.060 |
| T6 | 0.434 | 0.660 | 0.660 | 0.660 | 0.423 | 0.660 | 0.660 | 0.660 | 0.660 | 0.693 |
| G67 | 0.660 | 0.660 | 0.583 | 0.513 | 0.660 | 0.660 | 0.603 | 0.573 | 0.474 | 0.511 |
| T7 | 0.220 | 0.423 | 0.343 | 0.387 | 0.399 | 0.258 | 0.368 | 0.441 | 0.522 | 0.379 |
| BFL | 0.745 | 0.739 | 0.763 | 0.768 | 0.748 | 0.747 | 0.759 | 0.746 | 0.780 | 0.782 |
| EFL | 3.986 | 4.371 | 4.095 | 4.053 | 4.293 | 4.206 | 4.076 | 4.457 | 4.134 | 3.978 |
| TTL | 5.082 | 5.529 | 5.330 | 5.234 | 5.524 | 5.508 | 5.275 | 5.596 | 5.293 | 5.222 |
| ALT | 2.730 | 3.350 | 3.218 | 3.296 | 3.196 | 3.319 | 3.150 | 3.414 | 3.243 | 3.226 |
| AAG | 1.606 | 1.441 | 1.349 | 1.170 | 1.580 | 1.443 | 1.366 | 1.436 | 1.270 | 1.214 |
| Tmax | 0.660 | 0.660 | 0.660 | 0.660 | 0.660 | 0.660 | 0.660 | 0.660 | 0.660 | 0.693 |
| Tmin | 0.220 | 0.269 | 0.240 | 0.259 | 0.300 | 0.258 | 0.220 | 0.287 | 0.220 | 0.295 |
| Gmax | 0.660 | 0.660 | 0.583 | 0.513 | 0.660 | 0.660 | 0.603 | 0.573 | 0.474 | 0.511 |
| TL | 4.336 | 4.791 | 4.567 | 4.466 | 4.775 | 4.762 | 4.516 | 4.850 | 4.513 | 4.440 |
| ALT/AAG | 1.700 | 2.325 | 2.384 | 2.818 | 2.023 | 2.301 | 2.305 | 2.378 | 2.553 | 2.656 |
| (G67+T7)/T5 | 1.579 | 2.600 | 1.745 | 1.753 | 1.605 | 1.522 | 1.994 | 1.658 | 1.913 | 1.838 |
| (G23+T3)/T2 | 3.000 | 2.898 | 3.000 | 2.365 | 2.725 | 3.000 | 3.000 | 2.644 | 2.883 | 2.530 |
| EFL/T1 | 6.039 | 6.623 | 6.255 | 7.000 | 6.505 | 6.462 | 6.176 | 6.753 | 7.001 | 6.727 |
| (T4+T5)/T6 | 2.158 | 1.423 | 1.403 | 1.652 | 2.500 | 1.528 | 1.340 | 1.620 | 1.336 | 1.219 |
| T1/T3 | 2.540 | 1.655 | 1.661 | 1.805 | 1.860 | 1.400 | 1.847 | 2.225 | 1.600 | 1.401 |
| T6/(T4+G45) | 1.000 | 1.082 | 1.470 | 1.142 | 1.000 | 1.472 | 1.457 | 1.162 | 1.660 | 1.611 |
| Tmax/Tmin | 3.000 | 2.455 | 2.753 | 2.547 | 2.202 | 2.556 | 3.000 | 2.298 | 3.000 | 2.345 |
| AAG/(G56+G67) | 2.103 | 2.029 | 2.024 | 2.079 | 2.009 | 1.950 | 2.008 | 2.400 | 2.242 | 2.126 |
| Tmax/Gmax | 1.000 | 1.000 | 1.133 | 1.287 | 1.000 | 1.000 | 1.094 | 1.152 | 1.391 | 1.356 |
| (T4+T5)/T3 | 3.601 | 2.354 | 2.350 | 3.400 | 2.982 | 2.170 | 2.476 | 3.605 | 2.388 | 2.001 |
| TL/(T1+G12+T2) | 4.235 | 4.500 | 4.420 | 4.500 | 4.410 | 4.478 | 4.359 | 4.500 | 4.374 | 4.500 |
| T1/T2 | 2.985 | 2.455 | 2.731 | 2.235 | 2.202 | 2.354 | 3.000 | 2.298 | 2.684 | 2.001 |
| EFL/(T1+T2) | 4.524 | 4.706 | 4.579 | 4.836 | 4.473 | 4.536 | 4.632 | 4.706 | 5.100 | 4.486 |

FIG. 46

OPTICAL IMAGING LENS

CROSS REFERENCE TO RELATED APPLICATION

This application claims priority to P.R.C. Patent Application No. 201611253473.8, titled "Optical Imaging Lens," filed Dec. 30, 2016, with the State Intellectual Property Office of the People's Republic of China (SIPO), which is incorporated herein by its entirety.

TECHNICAL FIELD

The present disclosure relates to an optical imaging lens, and particularly, to an optical imaging lens having seven lens elements.

BACKGROUND

In the recent years, photography modules are developed fast because cell phones or digital cameras are used popular. The ever-increasing demand for smaller sized mobile devices, such as cell phones, digital cameras, etc. correspondingly triggered a growing need for a smaller sized photography module. While the size of a charge coupled device (CCD) or a complementary metal-oxide semiconductor (CMOS) is decreased and the performance of a charge coupled device (CCD) or a complementary metal-oxide semiconductor (CMOS) is enhanced, the size of an optical imaging lens mounted in a photography module must be decreased and the imaging quality must be maintained.

For example, in a typical optical imaging lens having seven lens elements, the distance from the object side surface of the first lens element to the image plane along the optical axis is too large to accommodate the dimensions of today's cell phones or digital cameras.

In this manner, there is a desirable objective for reducing the length of the imaging lens, enlarging the field of view, and maintaining good imaging quality.

SUMMARY

The present disclosure provides for an optical imaging lens. By designing the convex and/or concave surfaces of the seven lens elements, the length of the optical imaging lens may be shortened while maintaining good optical characteristics and imaging quality.

In the present disclosure, parameters used herein may be chosen from but not limited to parameters listed below:

| Parameter | Definition |
|---|---|
| T1 | The central thickness of the first lens element along the optical axis |
| G12 | The air gap between the first lens element and the second lens element along the optical axis |
| T2 | The central thickness of the second lens element along the optical axis |
| G23 | The air gap between the second lens element and the third lens element along the optical axis |
| T3 | The central thickness of the third lens element along the optical axis |
| G34 | The air gap between the third lens element and the fourth lens element along the optical axis |
| T4 | The central thickness of the fourth lens element along the optical axis |
| G45 | The air gap between the fourth lens element and the fifth lens element along the optical axis |
| T5 | The central thickness of the fifth lens element along the optical axis |
| G56 | The air gap between the fifth lens element and the sixth lens element along the optical axis |
| T6 | The central thickness of the sixth lens element along the optical axis |
| G67 | The air gap between the sixth lens element and the seventh lens element along the optical axis |
| T7 | The central thickness of the seventh lens element along the optical axis |
| G7F | The air gap between the seventh lens element and the filtering unit along the optical axis |
| TF | The central thickness of the filtering unit along the optical axis |
| GFP | The air gap between the filtering unit and an image plane along the optical axis |
| f1 | The focusing length of the first lens element |
| f2 | The focusing length of the second lens element |
| f3 | The focusing length of the third lens element |
| f4 | The focusing length of the fourth lens element |
| f5 | The focusing length of the fifth lens element |
| f6 | The focusing length of the sixth lens element |
| f7 | The focusing length of the seventh lens element |
| n1 | The refracting index of the first lens element |
| n2 | The refracting index of the second lens element |
| n3 | The refracting index of the third lens element |
| n4 | The refracting index of the fourth lens element |
| n5 | The refracting index of the fifth lens element |
| n6 | The refracting index of the sixth lens element |
| n7 | The refracting index of the seventh lens element |
| v1 | The Abbe number of the first lens element |
| v2 | The Abbe number of the second lens element |
| v3 | The Abbe number of the third lens element |
| v4 | The Abbe number of the fourth lens element |
| v5 | The Abbe number of the fifth lens element |
| v6 | The Abbe number of the sixth lens element |
| v7 | The Abbe number of the seventh lens element |
| HFOV | Half Field of View of the optical imaging lens |
| Fno | F-number of the optical imaging lens |
| EFL | The effective focal length of the optical imaging lens |
| TTL | The distance between the object-side surface of the first lens element and an image plane along the optical axis |
| ALT | The sum of the central thicknesses of the seven lens elements |
| AAG | The sum of all air gaps between the seven lens elements along the optical axis |
| BFL | The back focal length of the optical imaging lens/The distance from the image-side surface of the seventh lens element to the image plane along the optical axis |
| TL | The distance from the object-side surface of the first lens element to the image-side surface of the seventh lens element along the optical axis |
| Tmax | The maximum of the central thickness from the first lens element to the seventh lens element along the optical axis |
| Tmin | The minimum of the central thickness from the first lens element to the seventh lens element along the optical axis |
| Gmax | The maximum of the six air gaps from the first lens element to the seventh lens element along the optical axis |

In some embodiments, an optical imaging lens may comprise sequentially from an object side to an image side along an optical axis, a first, second, third, fourth, fifth, sixth and seventh lens elements. Each of the first, second, third, fourth, fifth, sixth and seventh lens elements have varying refracting power in some embodiments. Additionally, the lens elements may comprise an object-side surface facing toward the object side, an image-side surface facing toward the image side, and a central thickness defined along the optical axis. Moreover, the object-side surface of the third lens element may comprise a concave portion in a vicinity of a periphery of the third lens element, the object-side surface of the fourth lens element may comprise a concave portion in a vicinity of the optical axis, the image-side surface of the fourth lens element may comprise a convex portion in a vicinity of the optical axis, the image-side surface of the fifth lens element may comprise a convex portion in a vicinity of the optical axis, the object-side surface of the sixth lens element may comprise a concave portion in a vicinity of the optical axis, the image-side surface of the seventh lens element may comprise a concave portion in a vicinity of a periphery of the seventh lens element.

According to the above embodiment, the optical imaging lens may comprise no other lenses having refracting power beyond the seven lens elements. Further, the size of the optical imaging lens may be reduced while the optical imaging lens may satisfy any one of inequalities as follows:

$ALT/AAG \geq 1.7$ Inequality (1);

$(G67+T7)/T5 \leq 2.6$ Inequality (2);

$(G23+T3)/T2 \leq 3.0$ Inequality (3);

$EFL/T1 \leq 7.1$ Inequality (4);

$(T4+T5)/T6 \leq 2.5$ Inequality (5);

$T1/T3 \geq 1.4$ Inequality (6);

$T6/(T4+G45) \geq 1.0$ Inequality (7);

$T\max/T\min \leq 3.1$ Inequality (8).

In another embodiment, an optical imaging lens may comprise sequentially from an object side to an image side along an optical axis, a first, second, third, fourth, fifth, sixth and seventh lens elements. Each of the first, second, third, fourth, fifth, sixth and seventh lens elements have varying refracting power in some embodiments. Additionally, the lens elements may comprise an object-side surface facing toward the object side, an image-side surface facing toward the image side, and a central thickness defined along the optical axis. Moreover, the object-side surface of the third lens element may comprise a concave portion in a vicinity of a periphery of the third lens element, the object-side surface of the fourth lens element may comprise a concave portion in a vicinity of the optical axis, the image-side surface of the fourth lens element may comprise a convex portion in a vicinity of the optical axis, the object-side surface of the fifth lens element may comprise a concave portion in a vicinity of a periphery of the fifth lens element, the image-side surface of the fifth lens element may comprise a convex portion in a vicinity of the optical axis, the object-side surface of the sixth lens element may comprise a concave portion in a vicinity of the optical axis.

According to the above embodiment, the optical imaging lens may comprise no other lenses having refracting power beyond the seven lens elements and satisfy any one of inequalities as follows:

$ALT/AAG \geq 1.7$ Inequality (1);

$(G67+T7)/T5 \leq 2.6$ Inequality (2);

$AAG/(G56+G67) \leq 2.4$ Inequality (9);

$T\max/G\max \geq 1.0$ Inequality (10);

$(T4+T5)/T3 \geq 2.0$ Inequality (11);

$TL/(T1+G12+T2) \leq 4.5$ Inequality (12);

$T1/T2 \geq 2.0$ Inequality (13);

$EFL/(T1+T2) \leq 5.1$ Inequality (14).

Embodiments according to the present disclosure are not limited and could be selectively incorporated in other embodiments described herein. In some embodiments, more details about the parameters could be incorporated to enhance the control for the system performance and/or resolution. It is noted that the details listed here could be incorporated into example embodiments if no inconsistency occurs.

BRIEF DESCRIPTION OF THE DRAWINGS

Exemplary embodiments will be more readily understood from the following detailed description when read in conjunction with the appended drawing, in which:

FIG. 8 depicts a table of optical data for each lens element of the optical imaging lens of a first embodiment of the present disclosure;

FIG. 9 depicts a table of aspherical data of a first embodiment of the optical imaging lens according to the present disclosure;

FIG. 12 depicts a table of optical data for each lens element of the optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of the optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of a sixth embodiment of an optical imaging lens according to the present disclosure;

FIG. 29 depicts a table of aspherical data of a sixth embodiment of the optical imaging lens according to the present disclosure;

FIG. 32 depicts a table of optical data for each lens element of the optical imaging lens of a seventh embodiment of the present disclosure;

FIG. 33 depicts a table of aspherical data of a seventh embodiment of the optical imaging lens according to the present disclosure;

FIG. 36 depicts a table of optical data for each lens element of the optical imaging lens of an eighth embodiment of the present disclosure;

FIG. 37 depicts a table of aspherical data of an eighth embodiment of the optical imaging lens according to the present disclosure;

FIG. 40 depicts a table of optical data for each lens element of the optical imaging lens of a ninth embodiment of the present disclosure;

FIG. 41 depicts a table of aspherical data of a ninth embodiment of the optical imaging lens according to the present disclosure;

FIG. 44 depicts a table of optical data for each lens element of the optical imaging lens of a tenth embodiment of the present disclosure;

FIG. 45 depicts a table of aspherical data of a tenth embodiment of the optical imaging lens according to the present disclosure;

FIG. 46 is a table for the values of T1, G12, T2, G23, T3, G34, T4, G45, T5, G56, T6, G67, T7, BFL, EFL, TTL, ALT, AAG, Tmax, Tmin, Gmax, TL, ALT/AAG, (G67+T7)/T5, (G23+T3)/T2, EFL/T1, (T4+T5)/T6, T1/T3, T6/(T4+G45), Tmax/Tmin, AAG/(G56+G67), Tmax/Gmax, (T4+T5)/T3, TL/(T1+G12+T2), T1/T2, and EFL/(T1+T2)of the all ten example embodiments.

DETAILED DESCRIPTION

Figure 2:
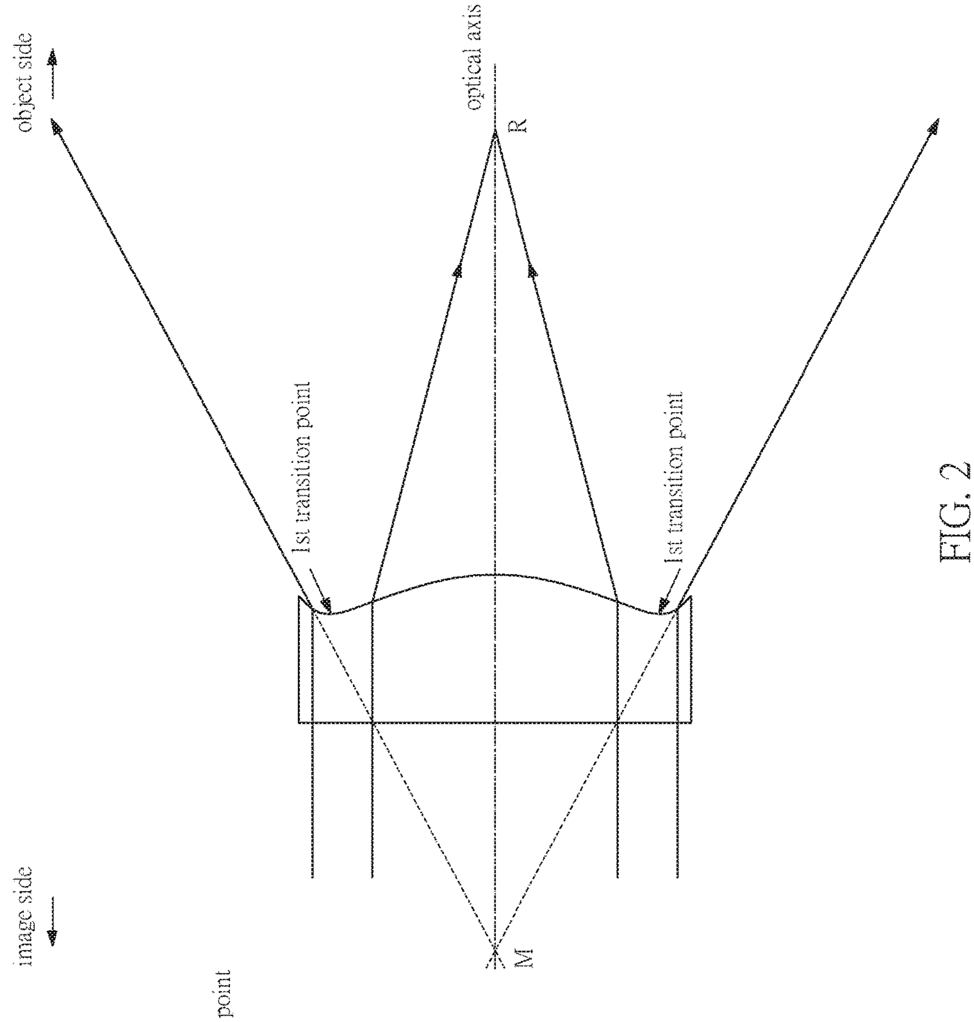
FIG. 2 depicts a schematic view of the relation between the surface shape and the optical focus of the lens element.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present disclosure, the description "a lens element having positive refracting power (or negative refracting power)" means that the paraxial refracting power of the lens element in Gaussian optics is positive (or negative). The description "An object-side (or image-side) surface of a lens element" may include a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element may be rotationally symmetric, where the optical axis I is the axis of symmetry. The region A of the lens element is defined as "a part in a vicinity of the optical axis", and the region C of the lens element is defined as "a part in a vicinity of a periphery of the lens element". Besides, the lens element may also have an extending part E extended radially and outwardly from the region C, namely the part outside of the clear aperture of the lens element. The extending part E may be used for physically assembling the lens element into an optical imaging lens system. Under normal circumstances, the imaging rays would not pass through the extending part E because those imaging rays only pass through the clear aperture. The structures and shapes of the aforementioned extending part E are only examples for technical explanation, the structures and shapes of lens elements should not be limited to these examples. Note that the extending parts of the lens element surfaces depicted in the following embodiments are partially omitted.

The following criteria are provided for determining the shapes and the parts of lens element surfaces set forth in the present disclosure. These criteria mainly determine the boundaries of parts under various circumstances including the part in a vicinity of the optical axis, the part in a vicinity of a periphery of a lens element surface, and other types of lens element surfaces such as those having multiple parts.

Figure 1:
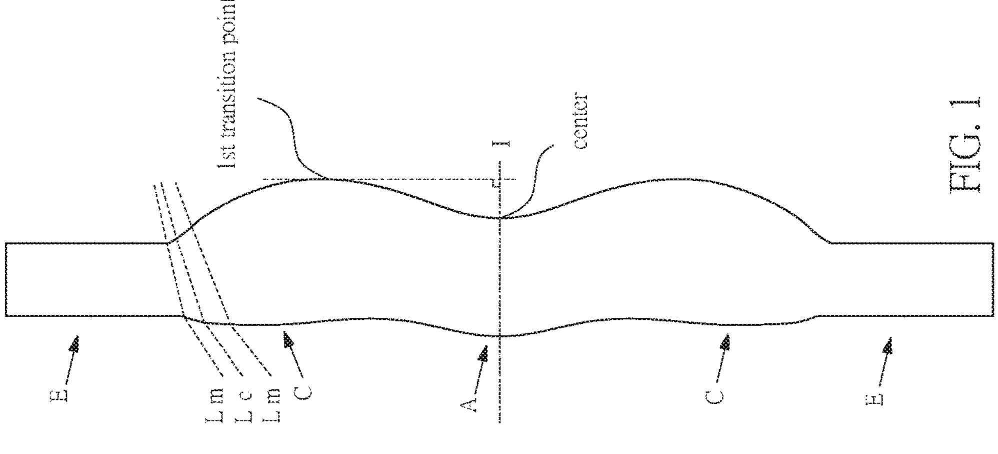
FIG. 1 depicts a cross-sectional view of one single lens element according to the present disclosure.

FIG. 1 depicts a radial cross-sectional view of a lens element. Before determining boundaries of those aforementioned portions, two referential points should be defined first, the central point and the transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining whether the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point may have a convex shape, the portion located radially outside of the first transition point may have a concave shape, and the first transition point is the point where the portion having a convex shape changes to the portion having a concave shape, namely the border of two adjacent portions. Alternatively, there is another method to determine whether a portion in a vicinity of the optical axis may have a convex or concave shape by referring to the sign of an "R" value, which is the (paraxial) radius of curvature of a lens surface. The R value may be used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the portion in a vicinity of the optical axis may be defined as the portion between 0-50% of the effective radius (radius of the clear aperture) of the surface, whereas the portion in a vicinity of a periphery of the lens element may be defined as the portion between 50-100% of effective radius (radius of the clear aperture) of the surface.

Figure 3:
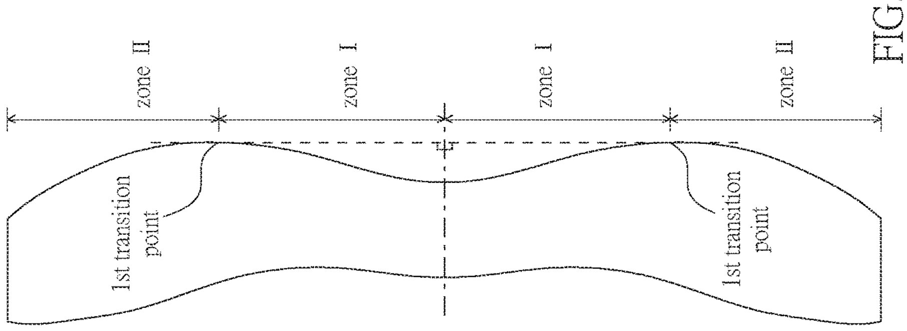
FIG. 3 depicts a schematic view of a first example of the surface shape and the effective radius of the lens element.

Referring to the first example depicted in FIG. 3, only one transition point, namely a first transition point, appears within the clear aperture of the image-side surface of the lens element. Portion I may be a portion in a vicinity of the optical axis, and portion II may be a portion in a vicinity of a periphery of the lens element. The portion in a vicinity of the optical axis may be determined as having a concave surface due to the R value at the image-side surface of the lens element is positive. The shape of the portion in a vicinity of a periphery of the lens element may be different from that of the radially inner adjacent portion, i.e. the shape of the portion in a vicinity of a periphery of the lens element may be different from the shape of the portion in a vicinity of the optical axis; the portion in a vicinity of a periphery of the lens element may have a convex shape.

Figure 4:
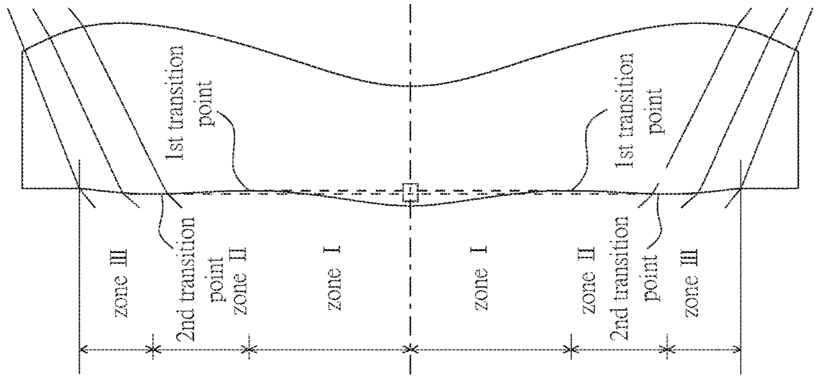
FIG. 4 depicts a schematic view of a second example of the surface shape and the effective radius of the lens element.

Referring to the second example depicted in FIG. 4, a first transition point and a second transition point may exist on the object-side surface (within the clear aperture) of a lens element. In which Here, portion I may be the portion in a vicinity of the optical axis, and portion III may be the portion in a vicinity of a periphery of the lens element. The portion in a vicinity of the optical axis may have a convex shape because the R value at the object-side surface of the lens element may be positive. The portion in a vicinity of a periphery of the lens element (portion III) may have a convex shape. What is more, there may be another portion having a concave shape existing between the first and second transition point (portion II).

Figure 5:
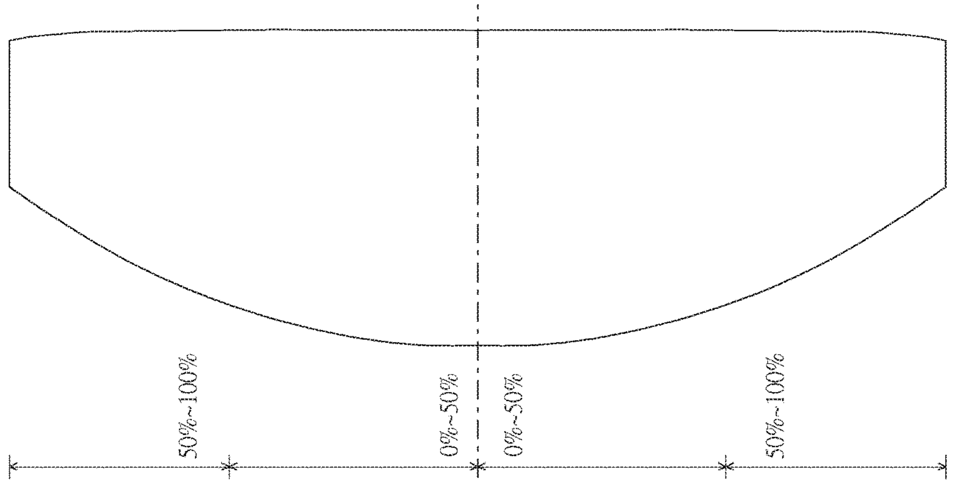
FIG. 5 depicts a schematic view of a third example of the surface shape and the effective radius of the lens element.

Referring to a third example depicted in FIG. 5, no transition point may exist on the object-side surface of the lens element. In this case, the portion between 0-50% of the effective radius (radius of the clear aperture) may be determined as the portion in a vicinity of the optical axis, and the portion between 50-100% of the effective radius may be determined as the portion in a vicinity of a periphery of the lens element. The portion in a vicinity of the optical axis of the object-side surface of the lens element may be determined as having a convex shape due to its positive R value, and the portion in a vicinity of a periphery of the lens element may be determined as having a convex shape as well.

Figure 6:
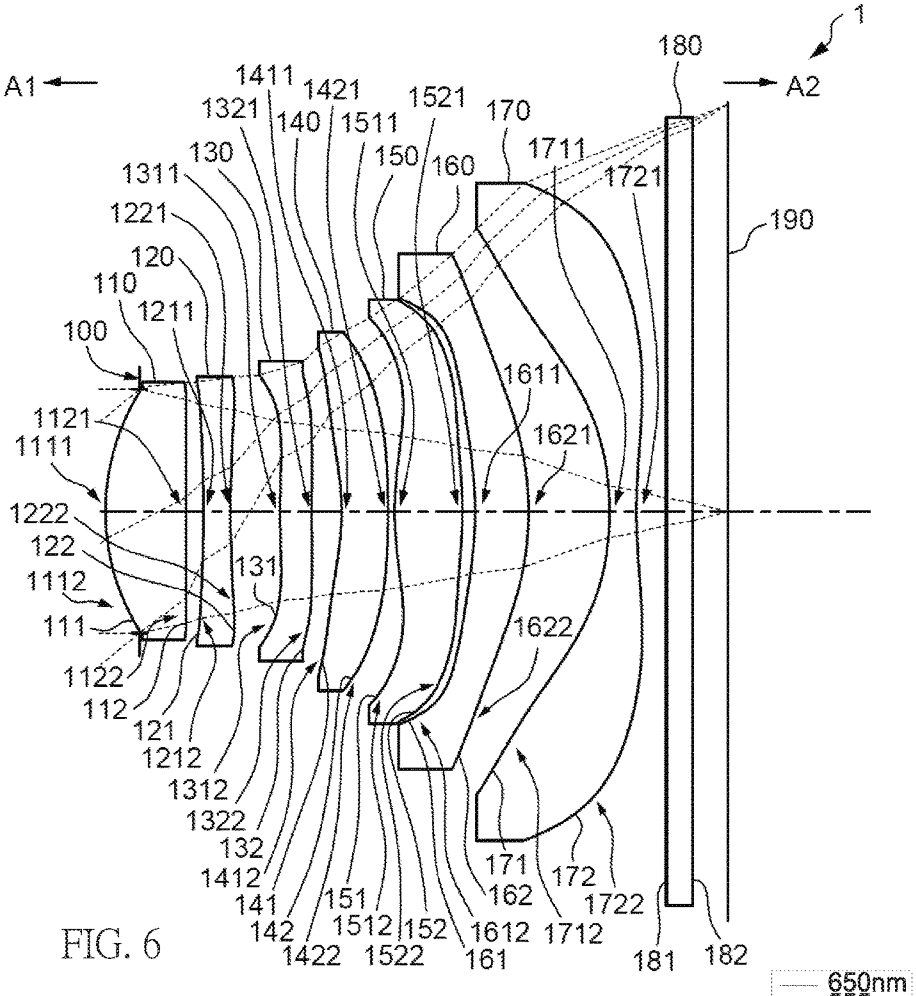
FIG. 6 depicts a cross-sectional view of a first embodiment of an optical imaging lens having seven lens elements according to the present disclosure.
Figure 7:
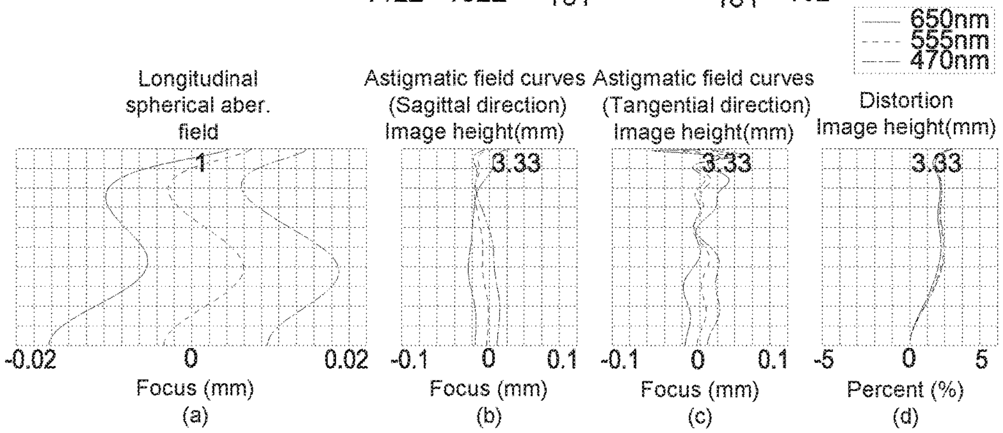
FIG. 7 depicts a chart of longitudinal spherical aberration and other kinds of optical aberrations of a first embodiment of the optical imaging lens according to the present disclosure.

Several exemplary embodiments and associated optical data will now be provided to illustrate non-limiting examples of optical imaging lens systems having good optical characteristics while increasing the field of view. Reference is now made to FIGS. 6-9. FIG. 6 illustrates an example cross-sectional view of an optical imaging lens 1 having six lens elements according to a first example embodiment. FIG. 7 shows example charts of longitudinal spherical aberration and other kinds of optical aberrations of the optical imaging lens 1 according to the first example embodiment. FIG. 8 illustrates an example table of optical data of each lens element of the optical imaging lens 1 according to the first example embodiment. FIG. 9 depicts an example table of aspherical data of the optical imaging lens 1 according to the first example embodiment.

As shown in FIG. 6, the optical imaging lens 1 of the present embodiment may comprise, in order from an object side A1 to an image side A2 along an optical axis, an aperture stop 100, a first lens element 110, a second lens element 120, a third lens element 130, a fourth lens element 140, a fifth lens element 150, a sixth lens element 160 and a seventh lens element 170. A filtering unit 180 and an image plane 190 of an image sensor (not shown) are positioned at the image side A2 of the optical imaging lens 1. Each of the first, second, third, fourth, fifth and sixth lens elements 110, 120, 130, 140, 150, 160, 170 and the filtering unit 180 may comprise an object-side surface 111/121/131/141/151/161/171/181 facing toward the object side A1 and an image-side surface 112/122/132/142/152/162/172/182 facing toward the image side A2. The example embodiment of the filtering unit 180 illustrated is an IR cut filter (infrared cut filter) positioned between the seventh lens element 170 and an image plane 190. The filtering unit 180 selectively absorbs light passing optical imaging lens 1 that has a specific wavelength. For example, if IR light is absorbed, IR light which is not seen by human eyes is prohibited from producing an image on the image plane 190.

Exemplary embodiments of each lens element of the optical imaging lens 1 will now be described with reference to the drawings. The lens elements of the optical imaging lens 1 are constructed using plastic material, in some embodiments.

An example embodiment of the first lens element 110 may have positive refracting power. The object-side surface 111 may comprise a convex portion 1111 in a vicinity of an optical axis and a convex portion 1112 in a vicinity of a periphery of the first lens element 110. The image-side surface 112 may comprise a concave portion 1121 in a vicinity of the optical axis and a convex portion 1122 in a vicinity of the periphery of the first lens element 110. The object-side surface 111 and the image-side surface 112 may be aspherical surfaces.

An example embodiment of the second lens element 120 may have negative refracting power. The object-side surface 121 may comprise a concave portion 1211 in a vicinity of the optical axis and a concave portion 1212 in a vicinity of a periphery of the second lens element 120. The image-side surface 122 may comprise a concave portion 1221 in a vicinity of the optical axis and a convex portion 1222 in a vicinity of the periphery of the second lens element 120.

An example embodiment of the third lens element 130 may have positive refracting power. The object-side surface 131 may comprise a convex portion 1311 in a vicinity of the optical axis and a concave portion 1312 in a vicinity of a periphery of the third lens element 130. The image-side surface 132 may comprise a concave portion 1321 in a vicinity of the optical axis and a concave portion 1322 in a vicinity of the periphery of the third lens element 130.

An example embodiment of the fourth lens element 140 may have negative refracting power. The object-side surface 141 may comprise a concave portion 1411 in a vicinity of the optical axis and a concave portion 1412 in a vicinity of a periphery of the fourth lens element 140. The image-side surface 142 may comprise a convex portion 1421 in a vicinity of the optical axis and a convex portion 1422 in a vicinity of the periphery of the fourth lens element 140.

An example embodiment of the fifth lens element 150 may have positive refracting power. The object-side surface 151 may comprise a convex portion 1511 in a vicinity of the optical axis and a concave portion 1512 in a vicinity of a periphery of the fifth lens element 150. The image-side surface 152 may comprise a convex portion 1521 in a vicinity of the optical axis and a convex portion 1522 in a vicinity of the periphery of the fifth lens element 150.

An example embodiment of the sixth lens element 160 may have positive refracting power. The object-side surface 161 may comprise a concave portion 1611 in a vicinity of the optical axis and a concave portion 1612 in a vicinity of a periphery of the sixth lens element 160. The image-side surface 162 may comprise a convex portion 1621 in a vicinity of the optical axis and a convex portion 1622 in a vicinity of the periphery of the sixth lens element 160.

An example embodiment of the seventh lens element 170 may have negative refracting power. The object-side surface 171 may comprise a concave portion 1711 in a vicinity of the optical axis and a concave portion 1712 in a vicinity of a periphery of the seventh lens element 170. The image-side surface 172 may comprise a concave portion 1721 in a vicinity of the optical axis and a convex portion 1722 in a vicinity of the periphery of the seventh lens element 170.

The aspherical surfaces including the object-side surface 111 of the first lens element 110, the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, the object-side surface 161 and the image-side surface 162 of the sixth lens element 160, the object-side surface 171 and the image-side surface 172 of the sixth lens element 170 are all defined by the following aspherical formula (1):

$$Z(Y) = \frac{Y^2}{R} \Bigg/ \left(1 + \sqrt{1 - (1+K)\frac{Y^2}{R^2}}\right) + \sum_{i=1}^{n} a_{2i} \times Y^i \qquad \text{formula (1)}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

represents an aspherical coefficient of level.

The values of each aspherical parameter are shown in FIG. 9.

FIG. 7(*a*) shows the longitudinal spherical aberration, wherein the horizontal axis of FIG. 7(*a*) defines the focus, and the vertical axis of FIG. 7(*a*) defines the field of view. FIG. 7(*b*) shows the astigmatism aberration in the sagittal direction, wherein the horizontal axis of FIG. 7(*b*) defines the focus, and the vertical axis of FIG. 7(*b*) defines the image height. FIG. 7(*c*) shows the astigmatism aberration in the tangential direction, wherein the horizontal axis of FIG. 7(*c*) defines the focus, and the vertical axis of FIG. 7(*c*) defines the image height. FIG. 7(*d*) shows the variation of the distortion aberration, wherein the horizontal axis of FIG. 7(*d*) defines the percentage, and the vertical axis of FIG. 7(*d*) defines the image height. The three curves with different wavelengths (470 nm, 555 nm, 650 nm) represent that off-axis light with respect to these wavelengths may be focused around an image point. From the vertical deviation of each curve shown in FIG. 7(*a*), the offset of the off-axis light relative to the image point may be within about ±0.018 mm. Therefore, the first embodiment may improve the longitudinal spherical aberration with respect to different wavelengths. Referring to FIG. 7(*b*), the focus variation with respect to the three different wavelengths (470 nm, 555 nm, 650 nm) in the whole field may fall within about ±0.04 mm. Referring to FIG. 7(*c*), the focus variation with respect to the three different wavelengths (470 nm, 555 nm, 650 nm) in the whole field may fall within about ±0.06 mm. Referring to FIG. 7(*d*), the horizontal axis of FIG. 7(*d*), the variation of the distortion aberration may be within about ±2.5%.

Please refer to FIG. 46 for the values of T1, G12, T2, G23, T3, G34, T4, G45, T5, G56, T6, G67, T7, BFL, EFL, TTL, ALT, AAG, Tmax, Tmin, Gmax, TL, ALT/AAG, (G67+T7)/T5, (G23+T3)/T2, EFL/T1, (T4+T5)/T6, T1/T3, T6/(T4+G45), Tmax/Tmin, AAG/(G56+G67), Tmax/Gmax, (T4+T5)/T3, TL/(T1+G12+T2), T1/T2, and EFL/(T1+T2) of the present embodiment.

The distance from the object-side surface 111 of the first lens element 110 to the image plane 190 along the optical axis (TTL) may be about 5.082 mm, EFL may be about 3.986 mm, HFOV may be about 39.169 degrees, the image height may be about 3.33 mm, and Fno may be about 1.515. In accordance with these optical values, the present embodiment may provide an optical imaging lens having a shortened length, and may be capable of accommodating a reduced product profile that also renders larger field of view and improved optical performance.

Figure 10:
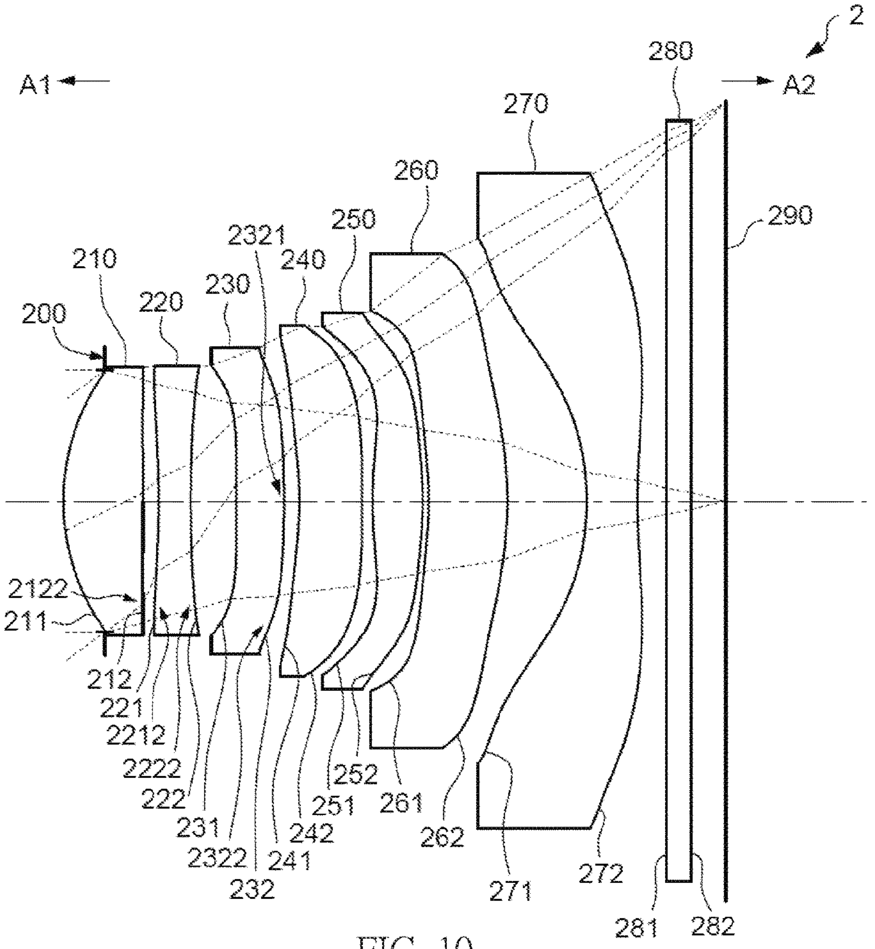
FIG. 10 depicts a cross-sectional view of a second embodiment of an optical imaging lens having seven lens elements according to the present disclosure.
Figure 11:
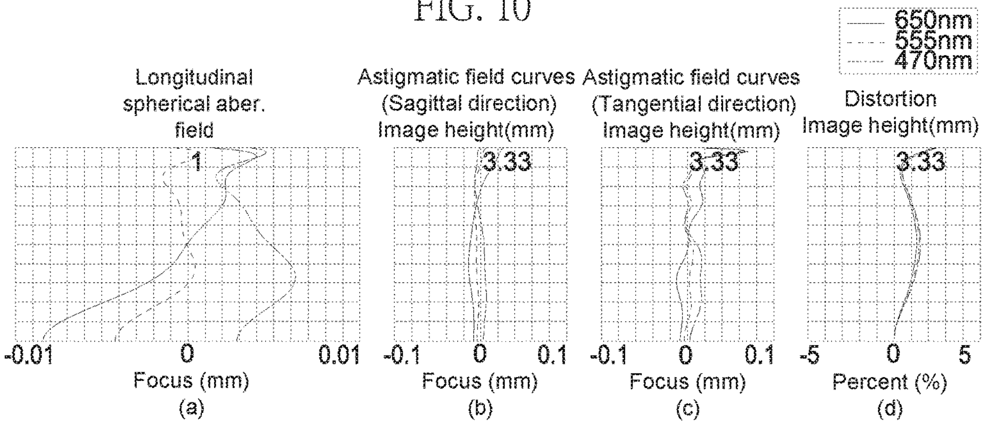
FIG. 11 depicts a chart of longitudinal spherical aberration and other kinds of optical aberrations of a second embodiment of the optical imaging lens according the present disclosure.

Reference is now made to FIGS. 10-13. FIG. 10 illustrates an example cross-sectional view of an optical imaging lens 2 having seven lens elements according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise an aperture stop 200, a first lens element 210, a second lens element 220, a third lens element 230, a fourth lens element 240, a fifth lens element 250, a sixth lens element 260 and seventh lens element 270.

The arrangement of the convex or concave surface structures, including the object-side surfaces 211, 231, 241, 251, 261 and 271 and the image-side surfaces 242, 252, 262 and 272 are generally similar to the optical imaging lens 1, but the refracting power of the sixth lens element 260 is negative and the differences between the optical imaging lens 1 and the optical imaging lens 2 may include the convex or concave surface structures of the object-side surface 221 and the image-side surfaces 212, 222 and 232. Additional differences may include a radius of curvature, a thickness, an aspherical data, and an effective focal length of each lens element. More specifically, the image-side surface 212 of the first lens element 210 may comprise a concave portion 2122 in a vicinity of a periphery of the first lens element 210, the object-side surface 221 of the second lens element 220 may comprise a convex portion 2212 in a vicinity of a periphery of the second lens element 220, the image-side surface 222 of the second lens element 220 may comprise a concave portion 2222 in a vicinity of a periphery of the second lens element 220, the image-side surface 232 of the third lens element 230 may comprise a convex portion 2321 in a vicinity of the optical axis and a convex portion 2322 in a vicinity of a periphery of the third lens element 230.

Here, for clearly showing the drawings of the present embodiment, only the surface shapes which are different from that in the first embodiment are labeled. Please refer to FIG. 12 for the optical characteristics of each lens element in the optical imaging lens 2 of the present embodiment.

From the vertical deviation of each curve shown in FIG. 11(*a*), the offset of the off-axis light relative to the image point may be within about ±0.009 mm. Referring to FIG. 11(*b*), the focus variation with respect to the three different wavelengths (470 nm, 555 nm, 650 nm) in the whole field may fall within about ±0.03 mm. Referring to FIG. 11(*c*), the focus variation with respect to the three different wavelengths (470 nm, 555 nm, 650 nm) in the whole field may fall within about ±0.08 mm. Referring to FIG. 11(*d*), the variation of the distortion aberration of the optical imaging lens 2 may be within about ±2.5%.

Please refer to FIG. 46 for the values of T1, G12, T2, G23, T3, G34, T4, G45, T5, G56, T6, G67, T7, BFL, EFL, TTL, ALT, AAG, Tmax, Tmin, Gmax, TL, ALT/AAG, (G67+T7)/T5, (G23+T3)/T2, EFL/T1, (T4+T5)/T6, T1/T3, T6/(T4+G45), Tmax/Tmin, AAG/(G56+G67), Tmax/Gmax, (T4+T5)/T3, TL/(T1+G12+T2), T1/T2, and EFL/(T1+T2) of the present embodiment.

In comparison with the first embodiment, the vertical deviation of each curve in the second embodiment may be smaller.

Figure 14:
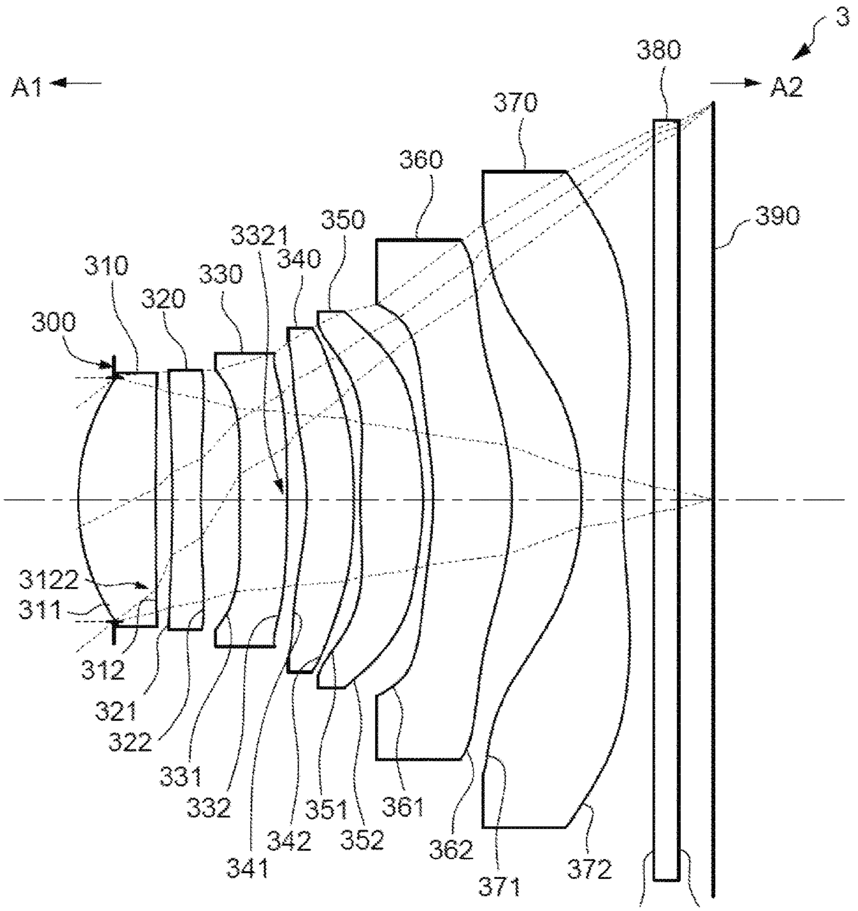
FIG. 14 depicts a cross-sectional view of a third embodiment of an optical imaging lens having seven lens elements according to the present disclosure.
Figure 15:
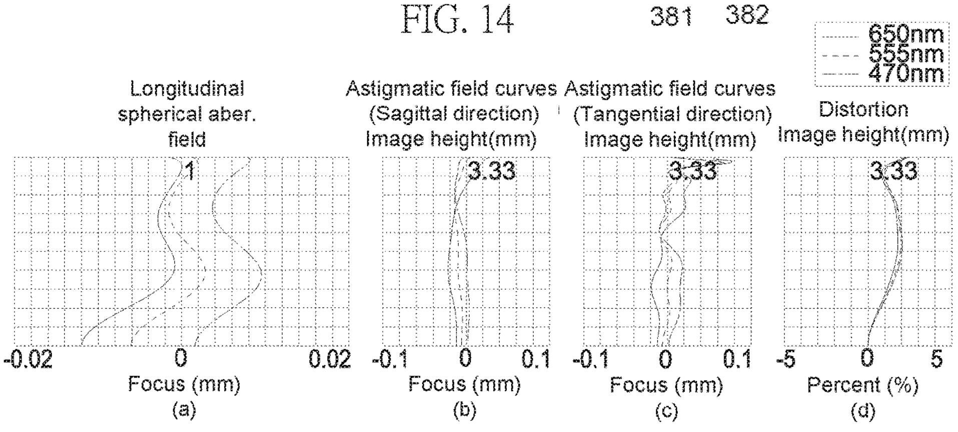
FIG. 15 depicts a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having seven lens elements according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise an aperture stop 300, a first lens element 310, a second lens element 320, a third lens element 330, a fourth lens element 340, a fifth lens element 350, a sixth lens element 360 and a seventh lens element 370.

The arrangement of the convex or concave surface structures, including the object-side surfaces 311, 321, 331, 341, 351, 361 and 371 and the image-side surfaces 332, 342, 352, 362 and 372 are generally similar to the optical imaging lens 1, but the differences between the optical imaging lens 1 and the optical imaging lens 3 may include the convex or concave surface structures of the image-side surfaces 312 and 332. Additional differences may include a radius of curvature, a thickness, aspherical data, and an effective focal length of each lens element. More specifically, the image-side surface 312 of the first lens element 310 may comprise a concave portion 3122 in a vicinity of a periphery of the first lens element 310, the image-side surface 332 of the third lens element 330 may comprise a convex portion 3321 in a vicinity of the optical axis.

Here, for clearly showing the drawings of the present embodiment, only the surface shapes which are different from that in the first embodiment are labeled. Please refer to FIG. 16 for the optical characteristics of each lens element in the optical imaging lens 3 of the present embodiment.

From the vertical deviation of each curve shown in FIG. 15(*a*), the offset of the off-axis light relative to the image point may be within about ±0.012 mm. Referring to FIG. 15(*b*), the focus variation with respect to the three different wavelengths (470 nm, 555 nm, 650 nm) in the whole field may fall within about ±0.03 mm. Referring to FIG. 15(*c*), the focus variation with respect to the three different wavelengths (470 nm, 555 nm, 650 nm) in the whole field may fall within about ±0.08 mm. Referring to FIG. 15(*d*), the variation of the distortion aberration of the optical imaging lens 3 may be within about ±2.5%.

Please refer to FIG. 46 for the values of T1, G12, T2, G23, T3, G34, T4, G45, T5, G56, T6, G67, T7, BFL, EFL, TTL, ALT, AAG, Tmax, Tmin, Gmax, TL, ALT/AAG, (G67+T7)/T5, (G23+T3)/T2, EFL/T1, (T4+T5)/T6, T1/T3, T6/(T4+G45), Tmax/Tmin, AAG/(G56+G67), Tmax/Gmax, (T4+T5)/T3, TL/(T1+G12+T2), T1/T2, and EFL/(T1+T2) of the present embodiment.

In comparison with the first embodiment, the vertical deviation of each curve in the third embodiment may be smaller.

Figure 18:
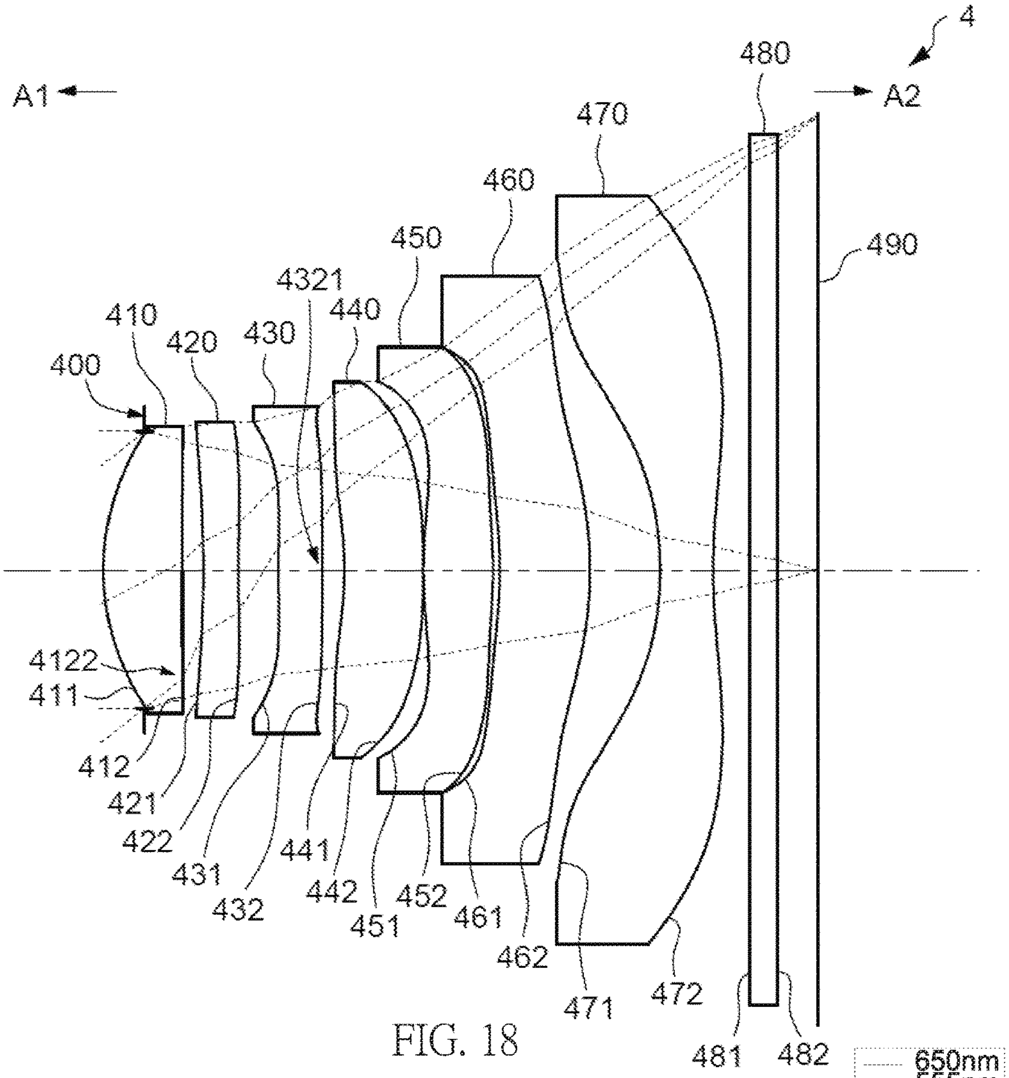
FIG. 18 depicts a cross-sectional view of a fourth embodiment of an optical imaging lens having seven lens elements according to the present disclosure.
Figure 19:
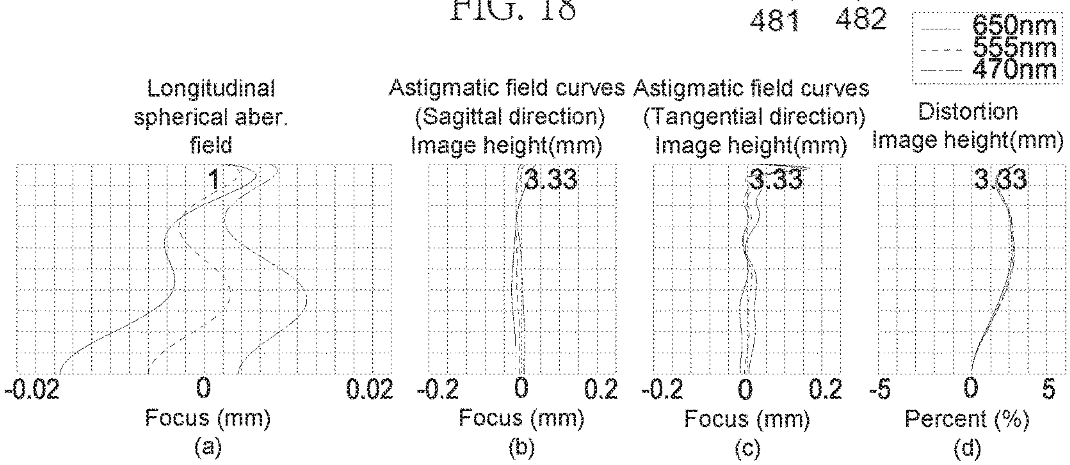
FIG. 19 depicts a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having seven lens elements according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise an aperture stop 400, a first lens element 410, a second lens element 420, a third lens element 430, a fourth lens element 440, a fifth lens element 450, a sixth lens element 460 and a seventh lens element 470.

The arrangement of the convex or concave surface structures, including the object-side surfaces 411, 421, 431, 441, 451, 461 and 471 and the image-side surfaces 422, 442, 452, 462 and 472 are generally similar to the optical imaging lens 1, but the differences between the optical imaging lens 1 and the optical imaging lens 4 may include the convex or concave surface structures of the image-side surfaces 412 and 432. Additional differences may include a radius of curvature, a thickness, aspherical data, and an effective focal length of each lens element. More specifically, the image-side surface 412 of the first lens element 410 may comprise a concave portion 4122 in a vicinity of a periphery of the first lens element 410, the image-side surface 432 of the third lens element 430 may comprise a convex portion 4321 in a vicinity of the optical axis.

Here, for clearly showing the drawings of the present embodiment, only the surface shapes which are different from that in the first embodiment are labeled. Please refer to FIG. 20 for the optical characteristics of each lens elements in the optical imaging lens 4 of the present embodiment.

From the vertical deviation of each curve shown in FIG. 19(*a*), the offset of the off-axis light relative to the image point may be within about ±0.016 mm. Referring to FIG. 19(*b*), the focus variation with respect to the three different wavelengths (470 nm, 555 nm, 650 nm) in the whole field may fall within about ±0.04 mm. Referring to FIG. 19(*c*), the focus variation with respect to the three different wavelengths (470 nm, 555 nm, 650 nm) in the whole field may fall within about ±0.16 mm. Referring to FIG. 19(*d*), the variation of the distortion aberration of the optical imaging lens 4 may be within about ±2.5%.

Please refer to FIG. 46 for the values of T1, G12, T2, G23, T3, G34, T4, G45, T5, G56, T6, G67, T7, BFL, EFL, TTL, ALT, AAG, Tmax, Tmin, Gmax, TL, ALT/AAG, (G67+T7)/T5, (G23+T3)/T2, EFL/T1, (T4+T5)/T6, T1/T3, T6/(T4+G45), Tmax/Tmin, AAG/(G56+G67), Tmax/Gmax, (T4+T5)/T3, TL/(T1+G12+T2), T1/T2, and EFL/(T1+T2) of the present embodiment.

In comparison with the first embodiment, the vertical deviation of each curve in the fourth embodiment may be smaller.

Figure 22:
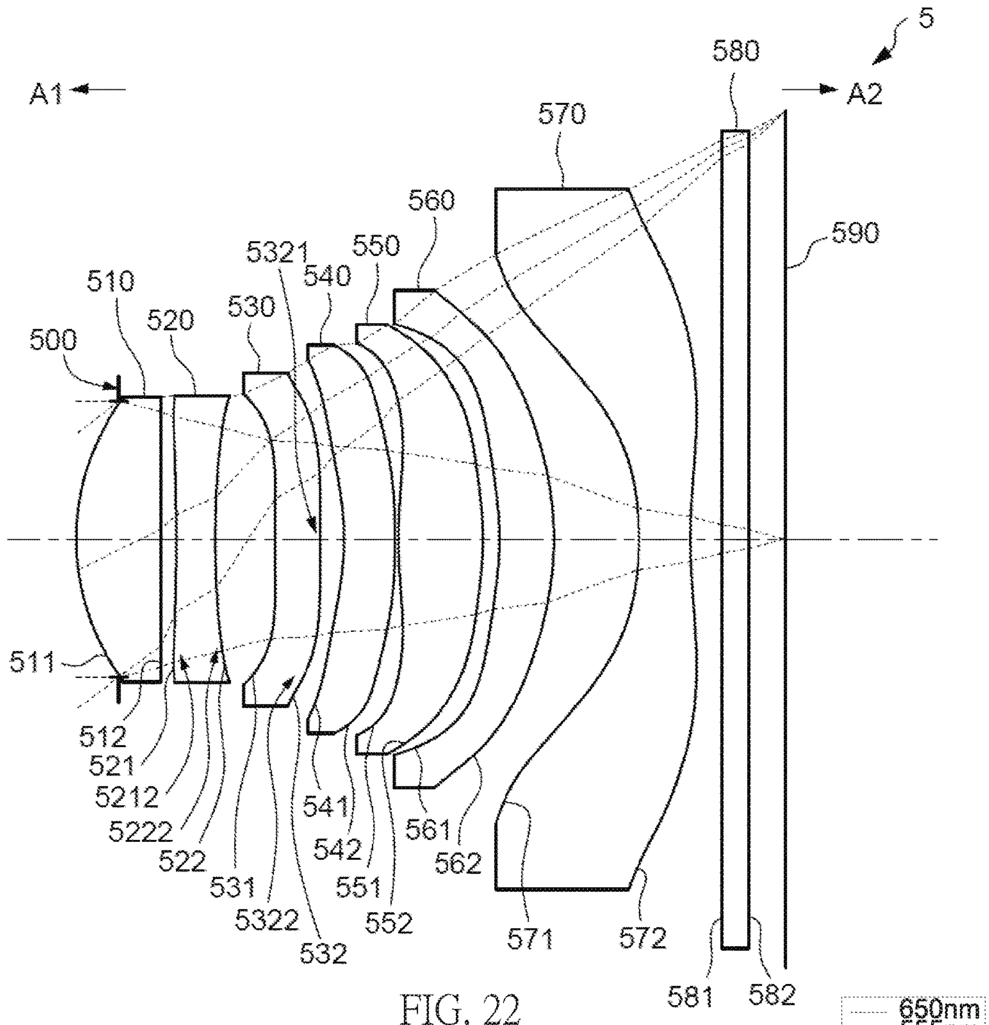
FIG. 22 depicts a cross-sectional view of a fifth embodiment of an optical imaging lens having seven lens elements according to the present disclosure.
Figure 23:
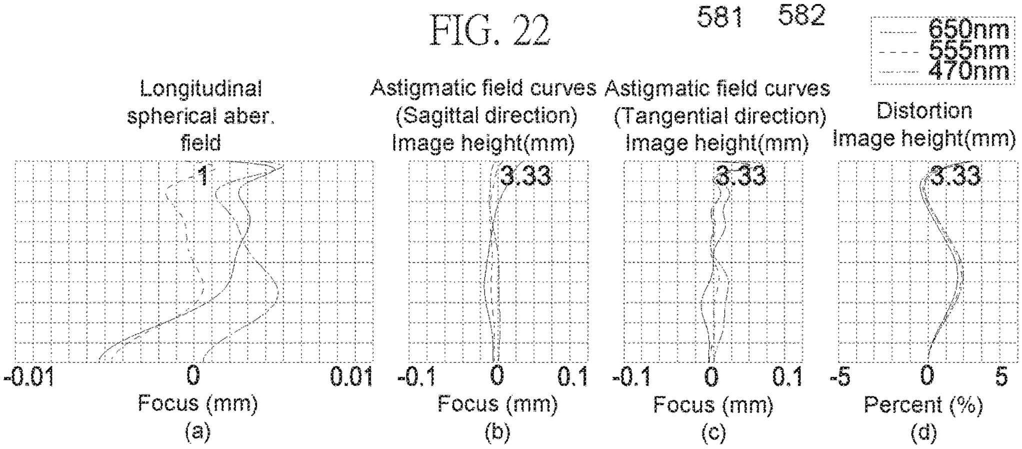
FIG. 23 depicts a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having seven lens elements according to a fifth example embodiment. FIG. 23 shows example charts of longitudinal spherical aberration and other kinds of optical aberrations of the optical imaging lens 5 according to the fifth embodiment.

FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise an aperture stop 500, a first lens element 510, a second lens element 520, a third lens element 530, a fourth lens element 540, a fifth lens element 550, a sixth lens element 560 and a seventh lens element 570.

The arrangement of the convex or concave surface structures, including the object-side surfaces 511, 531, 541, 551, 561 and 571 and the image-side surfaces 512, 542, 552, 562 and 572 are generally similar to the optical imaging lens 1, but the refracting power of the sixth lens element 560 is negative and the differences between the optical imaging lens 1 and the optical imaging lens 5 may include the convex or concave surface structures of the object-side surface 521 and the image-side surfaces 522 and 532. Additional differences may include a radius of curvature, a thickness, aspherical data, and an effective focal length of each lens element. More specifically, the object-side surface 521 of the second lens element 520 may comprise a convex portion 5212 in a vicinity of a periphery of the second lens element 520, the image-side surface 522 of the second lens element 520 may comprise a concave portion 5222 in a vicinity of a periphery of the second lens element 520, the image-side surface 532 of the third lens element 530 may comprise a convex portion 5321 in a vicinity of the optical axis and a convex portion 5322 in a vicinity of a periphery of the third lens element 530.

Here, for clearly showing the drawings of the present embodiment, only the surface shapes which are different from that in the first embodiment are labeled. FIG. 24 depicts the optical characteristics of each lens elements in the optical imaging lens 5 of the present embodiment.

From the vertical deviation of each curve shown in FIG. 23(*a*), the offset of the off-axis light relative to the image point may be within about ±0.006 mm. Referring to FIG. 23(*b*), the focus variation with respect to the three different wavelengths (470 nm, 555 nm, 650 nm) in the whole field may fall within about ±0.04 mm. Referring to FIG. 23(*c*), the focus variation with respect to the three different wavelengths (470 nm, 555 nm, 650 nm) in the whole field may fall within about ±0.06 mm. Referring to FIG. 23(*d*), the variation of the distortion aberration of the optical imaging lens 5 may be within about ±2.5%.

Please refer to FIG. 46 for the values of T1, G12, T2, G23, T3, G34, T4, G45, T5, G56, T6, G67, T7, BFL, EFL, TTL, ALT, AAG, Tmax, Tmin, Gmax, TL, ALT/AAG, (G67+T7)/T5, (G23+T3)/T2, EFL/T1, (T4+T5)/T6, T1/T3, T6/(T4+G45), Tmax/Tmin, AAG/(G56+G67), Tmax/Gmax, (T4+T5)/T3, TL/(T1+G12+T2), T1/T2, and EFL/(T1+T2) of the present embodiment.

In comparison with the first embodiment, the vertical deviation of each curve in the fifth embodiment may be smaller.

Figure 26:
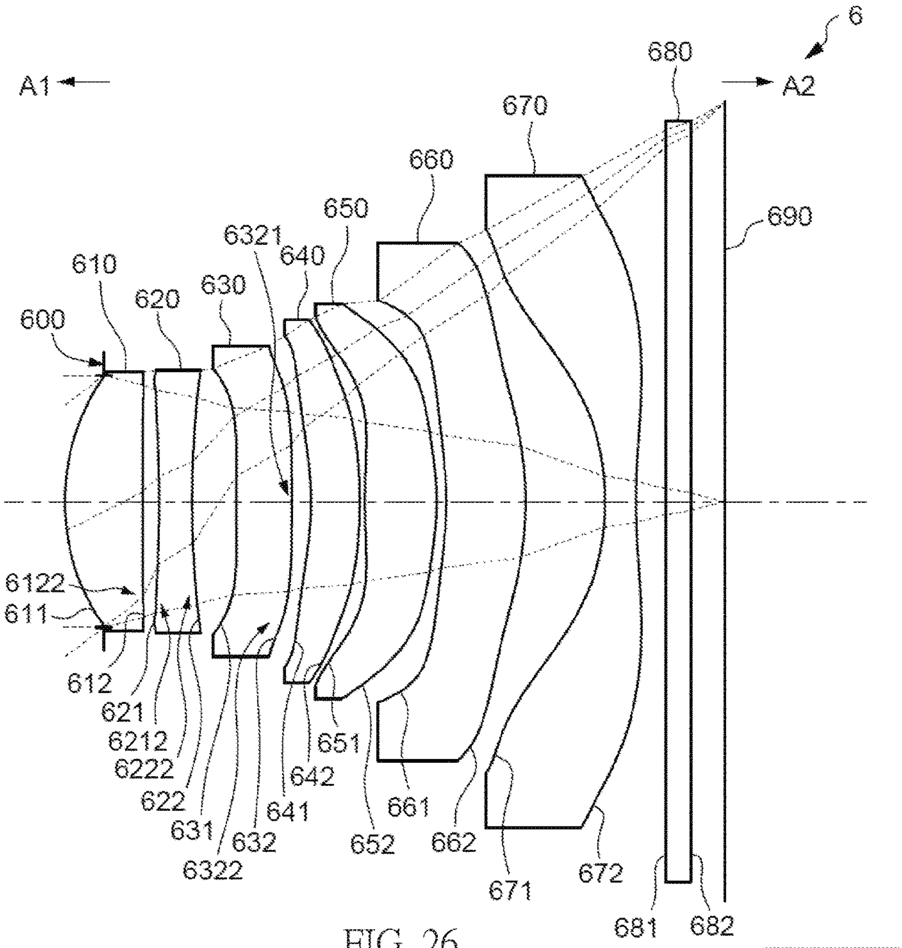
FIG. 26 depicts a cross-sectional view of a sixth embodiment of an optical imaging lens having seven lens elements according to the present disclosure.
Figure 27:
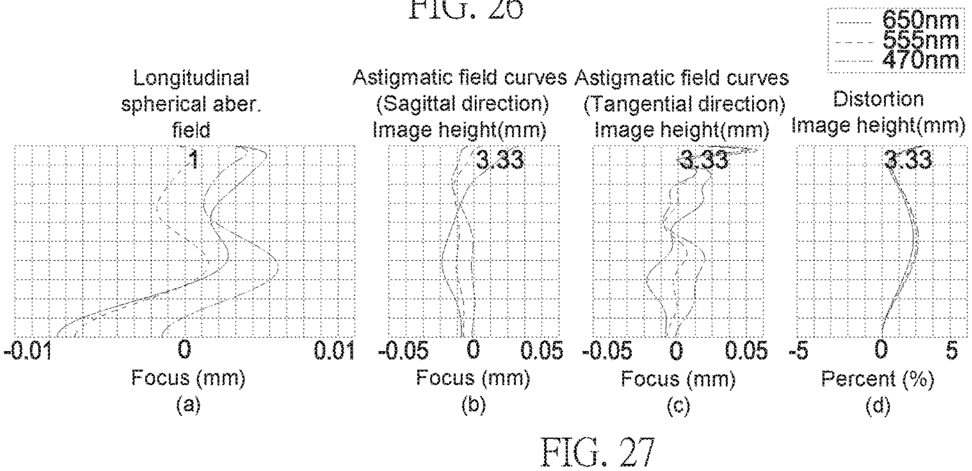
FIG. 27 depicts a chart of longitudinal spherical aberration and other kinds of optical aberrations of a sixth embodiment of the optical imaging lens according to the present disclosure.

Reference is now made to FIGS. 26-29. FIG. 26 illustrates an example cross-sectional view of an optical imaging lens 6 having seven lens elements according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise an aperture stop 600, a first lens element 610, a second lens element 620, a third lens element 630, a fourth lens element 640, a fifth lens element 650, a sixth lens element 660 and a seventh lens element 670.

The arrangement of the convex or concave surface structures, including the object-side surfaces 611, 631, 641, 651, 661 and 671 and the image-side surfaces 642, 652, 662 and 672 are generally similar to the optical imaging lens 1, but the refracting power of the sixth lens element 660 is negative and the differences between the optical imaging lens 1 and the optical imaging lens 6 may include the convex or concave surface structures of the object-side surface 621 and the image-side surfaces 612, 622 and 632. Additional differences may include a radius of curvature, a thickness, aspherical data, and an effective focal length of each lens element. More specifically, the image-side surface 612 of the first lens element 610 may comprise a concave portion 6122 in a vicinity of a periphery of the first lens element 610, the object-side surface 621 of the second lens element 620 may comprise a convex portion 6212 in a vicinity of a periphery of the second lens element 620, the image-side surface 622 of the second lens element 620 may comprise a concave portion 6222 in a vicinity of a periphery of the second lens element 620, the image-side surface 632 of the third lens element 630 may comprise a convex portion 6321 in a vicinity of the optical axis, the image-side surface 632 of the third lens element 630 may comprise a convex portion 6322 in a vicinity of a periphery of the third lens element 630.

Here, for clearly showing the drawings of the present embodiment, only the surface shapes which are different from that in the first embodiment are labeled. Please refer to FIG. 28 for the optical characteristics of each lens elements in the optical imaging lens 6 of the present embodiment.

From the vertical deviation of each curve shown in FIG. 27(*a*), the offset of the off-axis light relative to the image point may be within about ±0.008 mm. Referring to FIG. 27(*b*), the focus variation with respect to the three different wavelengths (470 nm, 555 nm, 650 nm) in the whole field may fall within about ±0.05 mm. Referring to FIG. 23(*c*), the focus variation with respect to the three different wavelengths (470 nm, 555 nm, 650 nm) in the whole field may fall within about ±0.05 mm. Referring to FIG. 27(*d*), the variation of the distortion aberration of the optical imaging lens 6 may be within about ±2.5%.

Please refer to FIG. 46 for the values of T1, G12, T2, G23, T3, G34, T4, G45, T5, G56, T6, G67, T7, BFL, EFL, TTL, ALT, AAG, Tmax, Tmin, Gmax, TL, ALT/AAG, (G67+T7)/T5, (G23+T3)/T2, EFL/T1, (T4+T5)/T6, T1/T3, T6/(T4+

G45), Tmax/Tmin, AAG/(G56+G67), Tmax/Gmax, (T4+T5)/T3, TL/(T1+G12+T2), T1/T2, and EFL/(T1+T2) of the present embodiment.

In comparison with the first embodiment, the vertical deviation of each curve in the sixth embodiment may be smaller.

Figure 30:
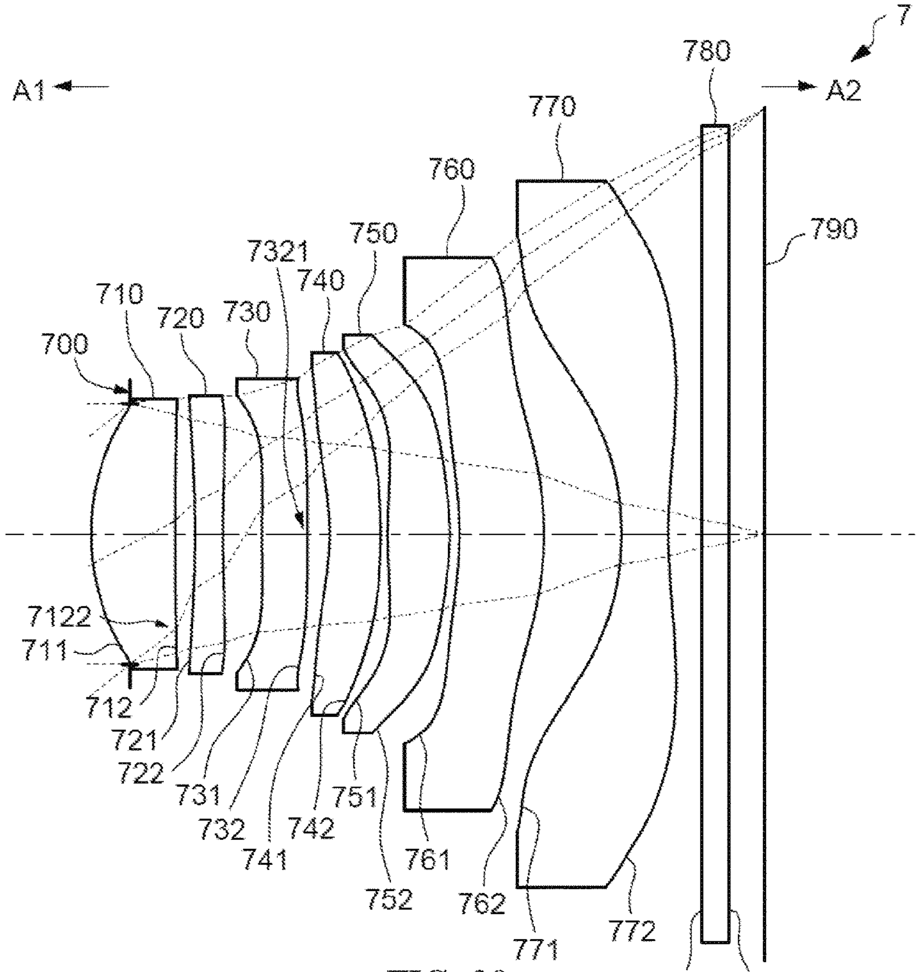
FIG. 30 depicts a cross-sectional view of a seventh embodiment of an optical imaging lens having seven lens elements according to the present disclosure.
Figure 31:
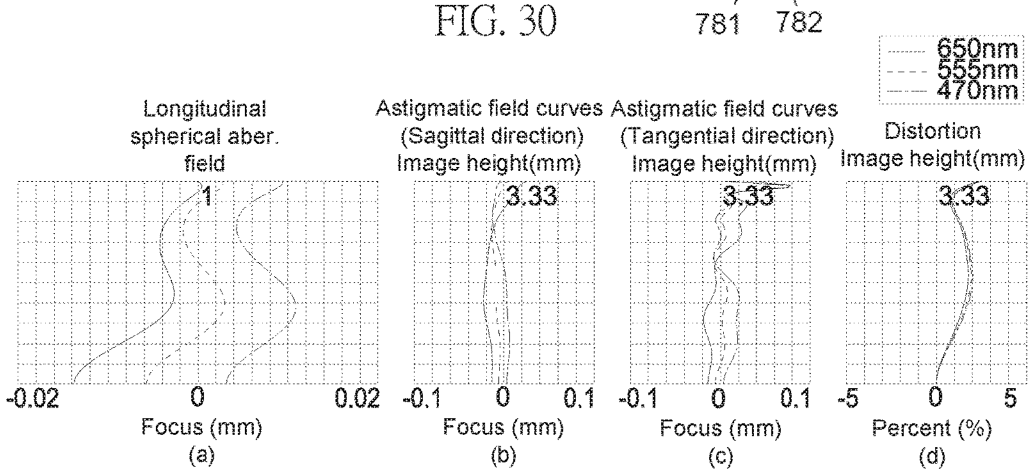
FIG. 31 depicts a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having seven lens elements according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise an aperture stop 700, a first lens element 710, a second lens element 720, a third lens element 730, fourth lens element 740, a fifth lens element 750, a sixth lens element 760 and a seventh lens element 770.

The arrangement of the convex or concave surface structures, including the object-side surfaces 711, 721, 731, 741, 751, 761 and 771 and the image-side surfaces 722, 742, 752, 762 and 772 are generally similar to the optical imaging lens 1, but the differences between the optical imaging lens 1 and the optical imaging lens 7 may include the convex or concave surface structures of the image-side surfaces 712 and 732. Additional differences may include a radius of curvature, a thickness, aspherical data, and an effective focal length of each lens element. More specifically, the image-side surface 712 of the first lens element 710 may comprise a concave portion 7122 in a vicinity of a periphery of the first lens element 710, the image-side surface 732 of the third lens element 730 may comprise a convex portion 7321 in a vicinity of the optical axis.

Here, for clearly showing the drawings of the present embodiment, only the surface shapes which are different from that in the first embodiment are labeled. Please refer to FIG. 32 for the optical characteristics of each lens elements in the optical imaging lens 7 of the present embodiment.

From the vertical deviation of each curve shown in FIG. 31(*a*), the offset of the off-axis light relative to the image point may be within about ±0.0014 mm. Referring to FIG. 31(*b*), the focus variation with respect to the three different wavelengths (470 nm, 555 nm, 650 nm) in the whole field may fall within about ±0.03 mm. Referring to FIG. 31(*c*), the focus variation with respect to the three different wavelengths (470 nm, 555 nm, 650 nm) in the whole field may fall within about ±0.08 mm. Referring to FIG. 31(*d*), the variation of the distortion aberration of the optical imaging lens 7 may be within about ±2.5%.

Please refer to FIG. 46 for the values of T1, G12, T2, G23, T3, G34, T4, G45, T5, G56, T6, G67, T7, BFL, EFL, TTL, ALT, AAG, Tmax, Tmin, Gmax, TL, ALT/AAG, (G67+T7)/T5, (G23+T3)/T2, EFL/T1, (T4+T5)/T6, T1/T3, T6/(T4+G45), Tmax/Tmin, AAG/(G56+G67), Tmax/Gmax, (T4+T5)/T3, TL/(T1+G12+T2), T1/T2, and EFL/(T1+T2) of the present embodiment.

In comparison with the first embodiment, the vertical deviation of each curve in the seventh embodiment may be smaller.

Figure 34:
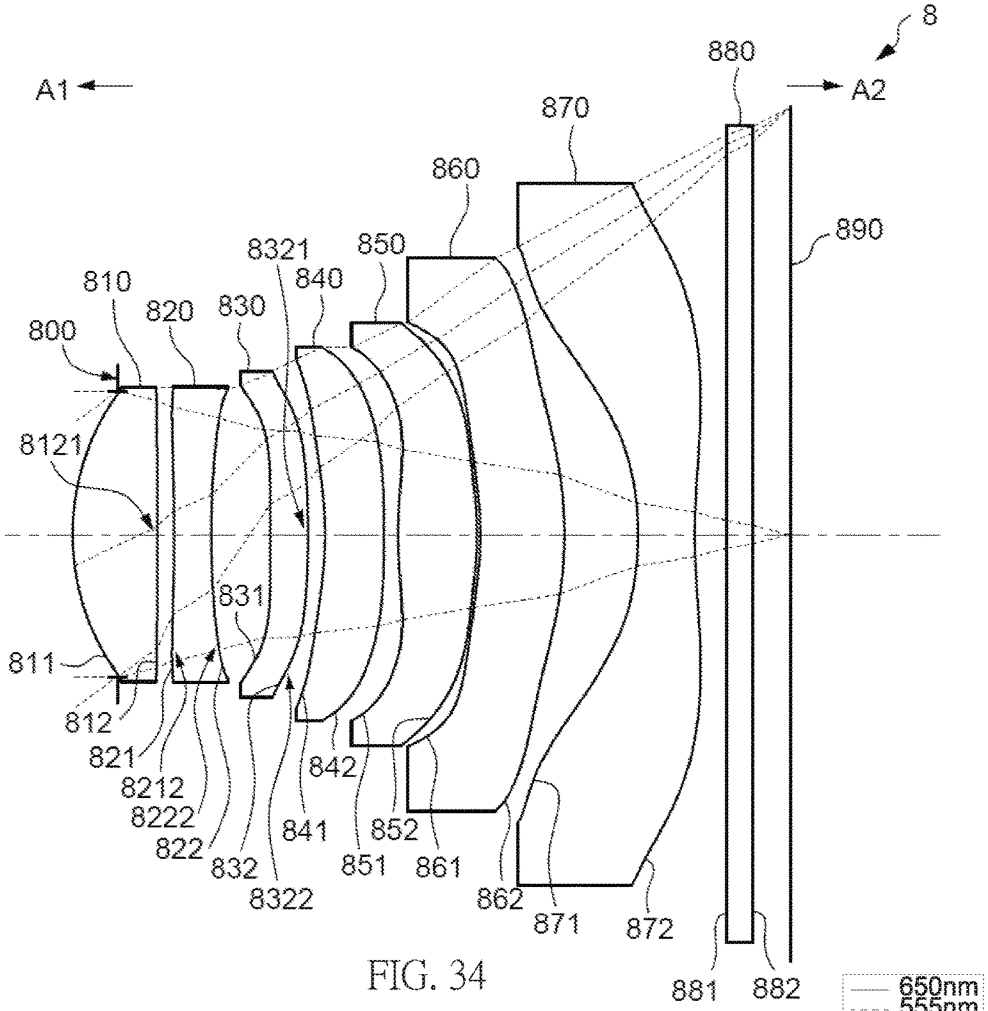
FIG. 34 depicts a cross-sectional view of an eighth embodiment of an optical imaging lens having seven lens elements according to the present disclosure.
Figure 35:
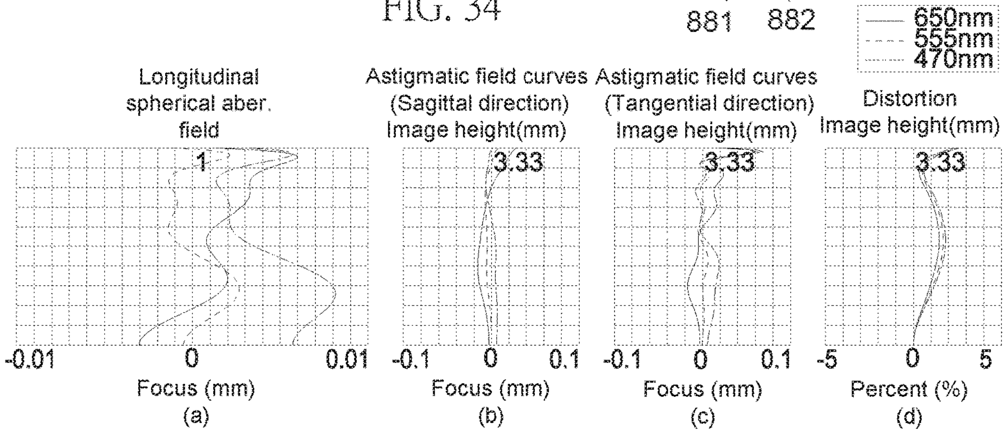
FIG. 35 depicts a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having seven lens elements according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise an aperture stop 800, a first lens element 810, a second lens element 820, a third lens element 830, a fourth lens element 840, a fifth lens element 850, a sixth lens element 860 and a seventh lens element 870.

The arrangement of the convex or concave surface structures, including the object-side surfaces 811, 831, 841, 851, 861 and 871 and the image-side surfaces 842, 852, 862 and 872 are generally similar to the optical imaging lens 1, but the refracting power of the sixth lens element 860 is negative and the differences between the optical imaging lens 1 and the optical imaging lens 8 may include the convex or concave surface structures of the object-side surface 821 and the image-side surfaces 812, 822 and 832. Additional differences may include a radius of curvature, a thickness, aspherical data, and an effective focal length of each lens element. More specifically, the image-side surface 812 of the first lens element 810 may comprise a convex portion 8121 in a vicinity of the optical axis, the object-side surface 821 of the second lens element 820 may comprise a convex portion 8212 in a vicinity of a periphery of the second lens element 820, the image-side surface 822 of the second lens element 820 may comprise a concave portion 8222 in a vicinity of a periphery of the second lens element 820, the image-side surface 832 of the third lens element 830 may comprise a convex portion 8321 in a vicinity of the optical axis and a convex portion 8322 in a vicinity of a periphery of the third lens element 830.

Here, for clearly showing the drawings of the present embodiment, only the surface shapes which are different from that in the first embodiment are labeled. Please refer to FIG. 36 for the optical characteristics of each lens elements in the optical imaging lens 8 of the present embodiment.

From the vertical deviation of each curve shown in FIG. 35(*a*), the offset of the off-axis light relative to the image point may be within about ±0.009 mm. Referring to FIG. 35(*b*), the focus variation with respect to the three different wavelengths (470 nm, 555 nm, 650 nm) in the whole field may fall within about ±0.08 mm. Referring to FIG. 35(*c*), the focus variation with respect to the three different wavelengths (470 nm, 555 nm, 650 nm) in the whole field may fall within about ±0.08 mm. Referring to FIG. 35(*d*), the variation of the distortion aberration of the optical imaging lens 8 may be within about ±2.5%.

Please refer to FIG. 46 for the values of T1, G12, T2, G23, T3, G34, T4, G45, T5, G56, T6, G67, T7, BFL, EFL, TTL, ALT, AAG, Tmax, Tmin, Gmax, TL, ALT/AAG, (G67+T7)/T5, (G23+T3)/T2, EFL/T1, (T4+T5)/T6, T1/T3, T6/(T4+G45), Tmax/Tmin, AAG/(G56+G67), Tmax/Gmax, (T4+T5)/T3, TL/(T1+G12+T2), T1/T2, and EFL/(T1+T2) of the present embodiment.

In comparison with the first embodiment, the vertical deviation of each curve in the eighth embodiment may be smaller.

Figure 38:
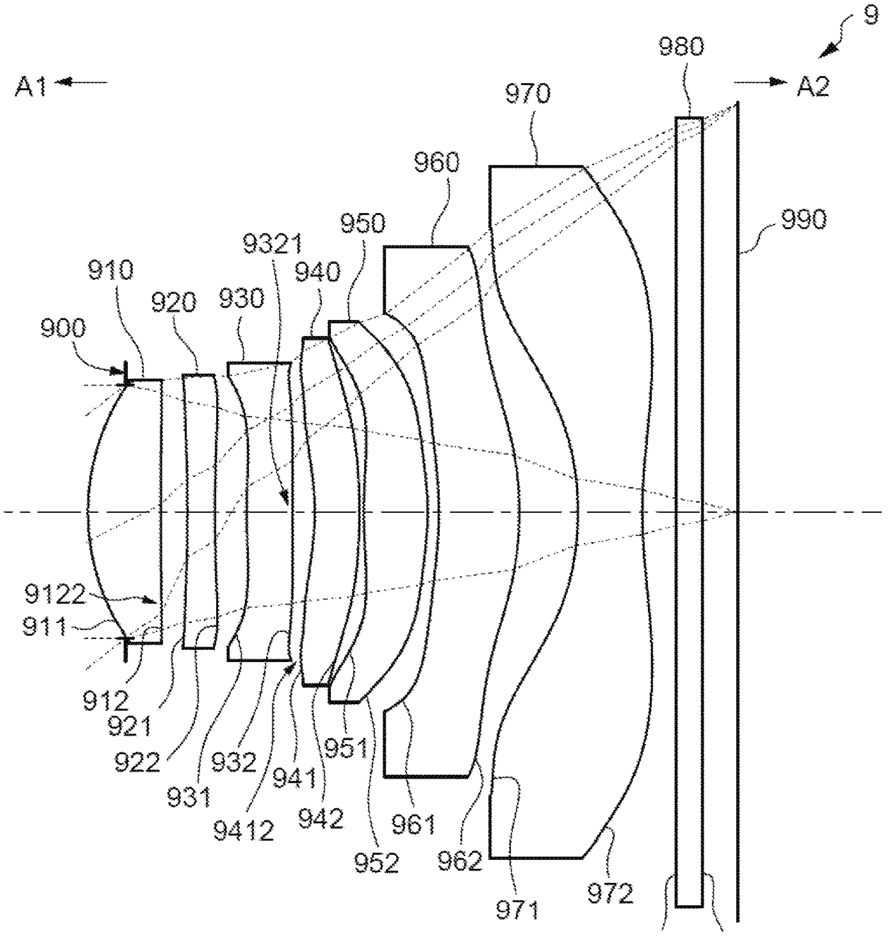
FIG. 38 depicts a cross-sectional view of a ninth embodiment of an optical imaging lens having seven lens elements according to the present disclosure.
Figure 39:
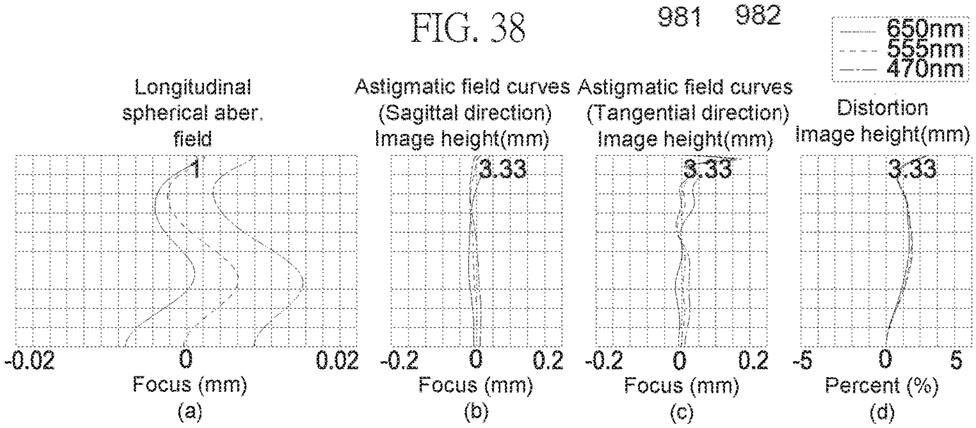
FIG. 39 depicts a chart of longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 having seven lens elements according to a ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment, in an order from an object side A1 to an image side A2 along an optical axis, may comprise an aperture stop 900, a first lens element 910, a second lens element 920, a third lens element 930, a fourth lens element 940, a fifth lens element 950, a sixth lens element 960 and seventh lens element 970.

The arrangement of the convex or concave surface structures, including the object-side surfaces 911, 921, 931, 951, 961 and 971 and the image-side surfaces 922, 942, 952, 962 and 972 are generally similar to the optical imaging lens 1, but the differences between the optical imaging lens 1 and the optical imaging lens 9 may include the convex or concave surface structures of the image-side surfaces 912 and 932. Additional differences may include a radius of curvature, a thickness, aspherical data, and an effective focal length of each lens element. More specifically, the image-side surface 912 of the first lens element 910 may comprise a concave portion 9122 in a vicinity of a periphery of the first lens element 910, the image-side surface 932 of the third lens element 930 may comprise a convex portion 9321 in a vicinity of the optical axis, and the object-side surface 941 of the fourth lens element 940 may comprise a convex portion 9412 in a vicinity of a periphery of the fourth lens element 940.

Here, for clearly showing the drawings of the present embodiment, only the surface shapes which are different from that in the first embodiment are labeled. Please refer to FIG. 40 for the optical characteristics of each lens elements in the optical imaging lens 9 of the present embodiment.

From the vertical deviation of each curve shown in FIG. 39(*a*), the offset of the off-axis light relative to the image point may be within about ±0.014 mm. Referring to FIG. 39(*b*), the focus variation with respect to the three different wavelengths (470 nm, 555 nm, 650 nm) in the whole field may fall within about ±0.08 mm. Referring to FIG. 39(*c*), the focus variation with respect to the three different wavelengths (470 nm, 555 nm, 650 nm) in the whole field may fall within about ±0.08 mm. Referring to FIG. 39(*d*), the variation of the distortion aberration of the optical imaging lens 9 may be within about ±2.5%.

Please refer to FIG. 46 for the values of T1, G12, T2, G23, T3, G34, T4, G45, T5, G56, T6, G67, T7, BFL, EFL, TTL, ALT, AAG, Tmax, Tmin, Gmax, TL, ALT/AAG, (G67+T7)/T5, (G23+T3)/T2, EFL/T1, (T4+T5)/T6, T1/T3, T6/(T4+G45), Tmax/Tmin, AAG/(G56+G67), Tmax/Gmax, (T4+T5)/T3, TL/(T1+G12+T2), T1/T2, and EFL/(T1+T2) of the present embodiment.

In comparison with the first embodiment, the vertical deviation of each curve in the ninth embodiment may be smaller.

Figure 42:
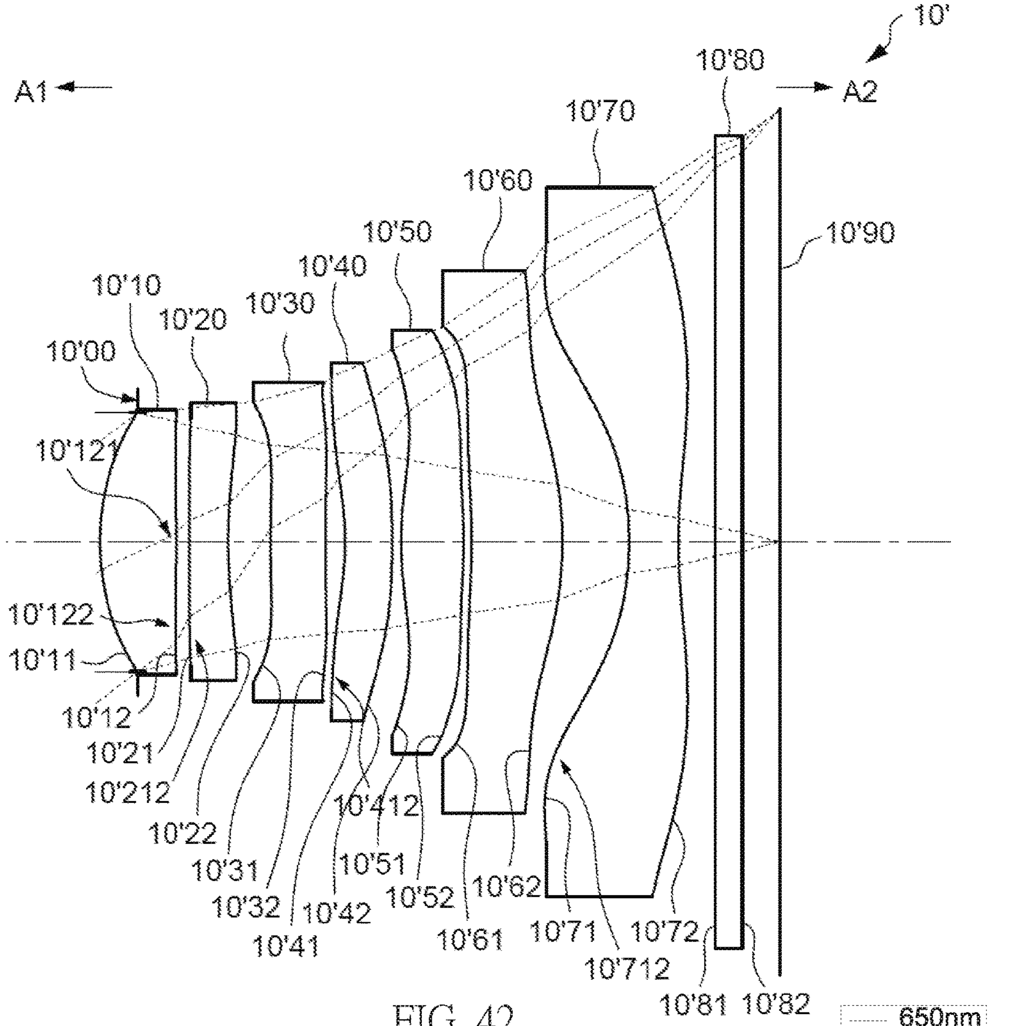
FIG. 42 depicts a cross-sectional view of a tenth embodiment of an optical imaging lens having seven lens elements according to the present disclosure.
Figure 43:
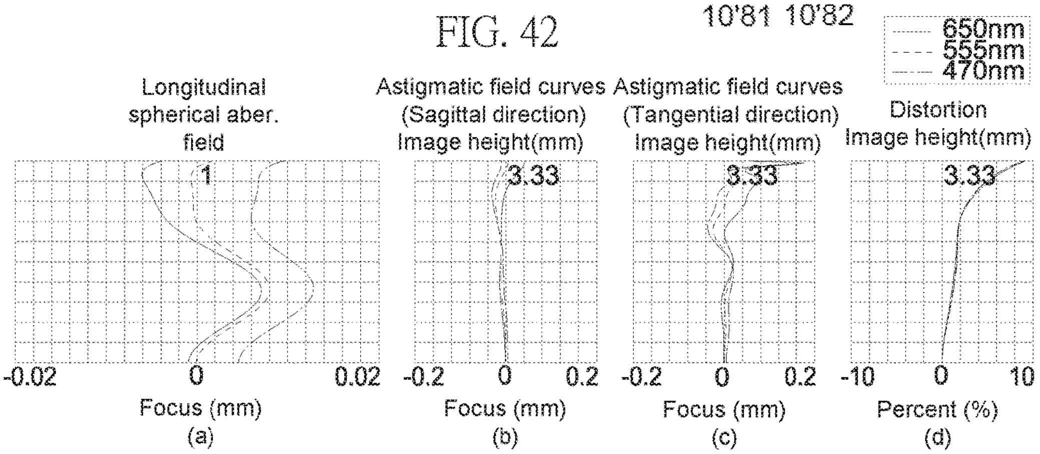
FIG. 43 depicts a chart of longitudinal spherical aberration and other kinds of optical aberrations of a tenth embodiment of the optical imaging lens according to the present disclosure.

Reference is now made to FIGS. 42-45. FIG. 42 illustrates an example cross-sectional view of an optical imaging lens 10' having seven lens elements according to a tenth example embodiment. FIG. 43 shows example charts of longitudinal spherical aberration and other kinds of optical aberrations of the optical imaging lens 10' according to the tenth embodiment. FIG. 44 shows an example table of optical data of each lens element of the optical imaging lens 10' according to the tenth example embodiment. FIG. 45 shows an example table of aspherical data of the optical imaging lens 10' according to the tenth example embodiment. The reference numbers labeled in the present embodiment are similar to those in the first embodiment for the similar elements, but here the reference numbers are initialed with 10', for example, reference number 10'31 for labeling the object-side surface of the third lens element 10'30, reference number 10'32 for labeling the image-side surface of the third lens element 10'30, etc.

As shown in FIG. 42, the optical imaging lens 10' of the present embodiment, in an order from an object side A1 to an image side A2 along an optical axis, may comprise an aperture stop 10'00, a first lens element 10'10, a second lens element 10'20, a third lens element 10'30, a fourth lens element 10'40, a fifth lens element 10'50, a sixth lens element 10'60 and seventh lens element 10'70.

The arrangement of the convex or concave surface structures, including the object-side surfaces 10'11, 10'31, 10'51, and 10'61 and the image-side surfaces 10'22, 10'32, 10'52, 10'62 and 10'72 are generally similar to the optical imaging lens 1, but the differences between the optical imaging lens 1 and the optical imaging lens 10' may include the convex or concave surface structures of the object-side surface 10'21, 10'41, 10'71 and the image-side surface 10'12. Additional differences may include a radius of curvature, a thickness, aspherical data, and an effective focal length of each lens element. More specifically, the image-side surface 10'12 of the first lens element 10'10 may comprise a convex portion 10'121 in a vicinity of the optical axis, the image-side surface 10'12 of the first lens element 10'10 may comprise a concave portion 10'122 in a vicinity of a periphery of the first lens element 10'10, the object-side surface 10'21 of the second lens element 10'20 may comprise a convex portion 10'212 in a vicinity of a periphery of the second lens element 10'20, the object-side surface 10'41 of the fourth lens element 10'40 may comprise a convex portion 10'412 in a vicinity of a periphery of the fourth lens element 10'40, the object-side surface 10'71 of the seventh lens element 10'70 may comprise a convex portion 10'712 in a vicinity of a periphery of the seventh lens element 10'70.

Here, for clearly showing the drawings of the present embodiment, only the surface shapes which are different from that in the first embodiment are labeled. Please refer to FIG. 44 for the optical characteristics of each lens elements in the optical imaging lens 10' of the present embodiment.

From the vertical deviation of each curve shown in FIG. 43(*a*), the offset of the off-axis light relative to the image point may be within about ±0.0014 mm. Referring to FIG. 43(*b*), the focus variation with respect to the three different wavelengths (470 nm, 555 nm, 650 nm) in the whole field may fall within about ±0.04 mm. Referring to FIG. 43(*c*), the focus variation with respect to the three different wavelengths (470 nm, 555 nm, 650 nm) in the whole field may fall within about ±0.20 mm. Referring to FIG. 43(*d*), the variation of the distortion aberration of the optical imaging lens 10' may be within about ±9%.

Please refer to FIG. 46 for the values of T1, G12, T2, G23, T3, G34, T4, G45, T5, G56, T6, G67, T7, BFL, EFL, TTL, ALT, AAG, Tmax, Tmin, Gmax, TL, ALT/AAG, (G67+T7)/T5, (G23+T3)/T2, EFL/T1, (T4+T5)/T6, T1/T3, T6/(T4+G45), Tmax/Tmin, AAG/(G56+G67), Tmax/Gmax, (T4+T5)/T3, TL/(T1+G12+T2), T1/T2, and EFL/(T1+T2) of the present embodiment.

In comparison with the first embodiment, the vertical deviation of each curve in the tenth embodiment may be smaller.

Please refer to FIG. 46 for the values of T1, G12, T2, G23, T3, G34, T4, G45, T5, G56, T6, G67, T7, BFL, EFL, TTL, ALT, AAG, Tmax, Tmin, Gmax, TL, ALT/AAG, (G67+T7)/T5, (G23+T3)/T2, EFL/T1, (T4+T5)/T6, T1/T3, T6/(T4+G45), Tmax/Tmin, AAG/(G56+G67), Tmax/Gmax, (T4+T5)/T3, TL/(T1+G12+T2), T1/T2, and EFL/(T1+T2) of all ten embodiments, and it is clear that the optical imaging lenses of the first to tenth embodiments may satisfy the Inequalities (1) to (14).

With respect to the optical imaging lens of the present disclosure, the object-side surface of the third lens element comprising a concave portion in a vicinity of a periphery region, the object-side surface of the fourth lens element comprising a concave portion in a vicinity of the optical axis, the image-side surface of the fourth lens element comprising a convex portion in a vicinity of the optical axis, the image-side surface of the fifth lens element comprising a convex portion in a vicinity of the optical axis, and the object-side surface of the sixth lens element comprising a concave portion in a vicinity of the optical axis may have advantageous to maintain imaging quality. Based on the above arrangement of concave and/or convex surfaces, the object-side surface of the fifth lens element further may comprise a concave portion in a vicinity of a periphery region or the image-side surface of the seventh lens element further may comprise a convex portion in a vicinity of a periphery region, the aberration of the optical imaging lens may be smaller.

For shortening the length of the optical imaging lens and maintaining imaging quality, the thickness of each lens element and air gaps between adjacent lens elements should be decreased appropriately. However, the design of the thickness of each lens element may consider the air gaps if the optical imaging lens needs to be manufactured more easily and to provide better imaging quality. Therefore, the arrangement of the optical imaging lens may be better while the optical imaging lens satisfies inequalities as follows:

$ALT/AAG \geq 1.7$, and the more perfect range may satisfy $1.7 \leq ALT/AAG \leq 3.0$;

$(G67+T7)/T5 \leq 2.6$, and the more perfect range may satisfy $1.5 \leq (G67+T7)/T5 \leq 2.6$;

$(G23+T3)/T2 \leq 3.0$, and the more perfect range may satisfy $2.0 \leq (G23+T3)/T2 \leq 3.0$;

$EFL/T1 \leq 7.1$, and the more perfect range may satisfy $5.5 \leq EFL/T1 \leq 7.1$;

$(T4+T5)/T6 \leq 2.5$, and the more perfect range may satisfy $1.0 \leq (T4+T5)/T6 \leq 2.5$;

$T1/T3 \geq 1.4$, and the more perfect range may satisfy $1.4 \leq T1/T3 \leq 2.6$;

$T6/(T4+G45) \geq 1.0$, and the more perfect range may satisfy $1.0 \leq T6/(T4+G45) \leq 1.8$;

$Tmax/Tmin \leq 3.1$, and the more perfect range may satisfy $2.0 \leq Tmax/Tmin \leq 3.1$;

$AAG/(G56+G67) \leq 2.4$, and the more perfect range may satisfy $1.8 \leq AAG/(G56+G67) \leq 2.4$;

$Tmax/Gmax \geq 1.0$, and the more perfect range may satisfy $1.0 \leq Tmax/Gmax \leq 1.6$;

$(T4+T5)/T3 \geq 2.0$, and the more perfect range may satisfy $2.0 \leq (T4+T5)/T3 \leq 3.7$;

$TL/(T1+G12+T2) \leq 4.5$, and the more perfect range may satisfy $3.7 \leq TL/(T1+G12+T2) \leq 4.5$;

$T1/T2 \geq 2.0$, and the more perfect range may satisfy $2.0 \leq T1/T2 \leq 3.0$;

$EFL/(T1+T2) \leq 5.1$, and the more perfect range may satisfy $3.8 \leq EFL/(T1+T2) \leq 5.1$.

Any one of the aforementioned inequalities could be selectively incorporated in other inequalities to apply to the present embodiments, but are not limited. Embodiments according to the present disclosure are not limited and could be selectively incorporated in other embodiments described herein. In some embodiments, more details about the parameters could be incorporated to enhance the control for the system performance and/or resolution. For example, the object-side surface of the first lens element may comprise a convex portion in a vicinity of the optical axis. It is noted that the details listed here could be incorporated into example embodiments if no inconsistency occurs.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising first, second, third, fourth, fifth, sixth and seventh lens elements, each of the first, second, third, fourth, fifth, sixth and seventh lens elements having refracting power, an object-side surface facing toward the object side and an image-side surface facing toward the image side, wherein:

the object-side surface of the third lens element comprises a concave portion in a vicinity of a periphery of the third lens element;

the object-side surface of the fourth lens element comprises a concave portion in a vicinity of the optical axis;

the image-side surface of the fourth lens element comprises a convex portion in a vicinity of the optical axis;

the image-side surface of the fifth lens element comprises a convex portion in a vicinity of the optical axis;

the object-side surface of the sixth lens element comprises a concave portion in a vicinity of the optical axis;

the image-side surface of the seventh lens element comprises a convex portion in a vicinity of a periphery of the seventh lens element; and the optical imaging lens comprises no other lenses having refracting power beyond the first, second, third, fourth, fifth, sixth and seventh lens elements.

2. The optical imaging lens according to claim 1, further satisfying an inequality:

ALT/AAG≥1.7, wherein a sum of the central thicknesses from the first to the seventh lens elements along the optical axis is represented by ALT, and a sum of air gaps between the first to the seventh lens elements along the optical axis is represented by AAG.

3. The optical imaging lens according to claim 1, further satisfying an inequality:

(G67+T7)/T5≤2.6, wherein an air gap between the sixth lens element and the seventh lens element along the optical axis is represented by G67, a central thickness of the seventh lens element along the optical axis is represented by T7, and a central thickness of the fifth lens element along the optical axis is represented by T5.

4. The optical imaging lens according to claim 1, further satisfying an inequality:

(G23+T3)/T2≤3.0, wherein an air gap between the second lens element and the third lens element along the optical axis is represented by G23, a central thickness of the second lens element along the optical axis is represented by T2, and a central thickness of the third lens element along the optical axis is represented by T3.

5. The optical imaging lens according to claim 1, further satisfying an inequality: EFL/T1≤7.1, wherein an effective focal length of the optical imaging lens is represented by EFL, and a central thickness of the first lens element along the optical axis is represented by T1.

6. The optical imaging lens according to claim 1, further satisfying an inequality:

(T4+T5)/T6≤2.5, wherein a central thickness of the fourth lens element along the optical axis is represented by T4, a central thickness of the fifth lens element along the optical axis is represented by T5, and a central thickness of the sixth lens element along the optical axis is represented by T6.

7. The optical imaging lens according to claim 1, further satisfying an inequality: T1/T3≥1.4, wherein a central thickness of the first lens element along the optical axis is represented by T1, and a central thickness of the third lens element along the optical axis is represented by T3.

8. The optical imaging lens according to claim 1, further satisfying an inequality:

T6/(T4+G45)≥1.0, wherein a central thickness of the fourth lens element along the optical axis is represented by T4, a central thickness of the sixth lens element along the optical axis is represented by T6, and an air gap between the fourth lens element and the fifth lens element along the optical axis is represented by G45.

9. The optical imaging lens according to claim 1, further satisfying an inequality:

Tmax/Tmin≤3.1, wherein a maximum of the central thickness from the first lens element to the seventh lens element along the optical axis is represented by Tmax, and a minimum of the central thickness from the first lens element to the seventh lens element along the optical axis is represented by Tmin.

10. An optical imaging lens, sequentially from an object side to an image side along an optical axis, comprising first, second, third, fourth, fifth, sixth and seventh lens elements, each of the first, second, third, fourth, fifth, sixth and seventh lens elements having refracting power, an object-side surface facing toward the object side and an image-side surface facing toward the image side, wherein:

the object-side surface of the third lens element comprises a concave portion in a vicinity of a periphery of the third lens element;

the object-side surface of the fourth lens element comprises a concave portion in a vicinity of the optical axis;

the image-side surface of the fourth lens element comprises a convex portion in a vicinity of the optical axis;

the object-side surface of the fifth lens element comprises a concave portion in a vicinity of a periphery of the fifth lens element;

the image-side surface of the fifth lens element comprises a convex portion in a vicinity of the optical axis;

the object-side surface of the sixth lens element comprises a concave portion in a vicinity of the optical axis; and the optical imaging lens comprises no other lenses having refracting power beyond the first, second, third, fourth, fifth, sixth and seventh lens elements.

11. The optical imaging lens according to claim 10, further satisfying an inequality:

ALT/AAG≥1.7, wherein a sum of the central thicknesses from the first to the seventh lens elements along the optical axis is represented by ALT, and a sum of air gaps between the first to the seventh lens elements along the optical axis is represented by AAG.

12. The optical imaging lens according to claim 10, further satisfying an inequality:

(G67+T7)/T5≤2.6, wherein an air gap between the sixth lens element and the seventh lens element along the optical axis is represented by G67, a central thickness of the seventh lens element along the optical axis is represented by T7, and a central thickness of the fifth lens element along the optical axis is represented by T5.

13. The optical imaging lens according to claim 10, further satisfying an inequality:

AAG/(G56+G67)≤2.4, wherein a sum of air gaps between the first to the seventh lens elements along the optical axis is represented by AAG, an air gap between the fifth lens element and the sixth lens element along the optical axis is represented by G56, and an air gap between the sixth lens element and the seventh lens element along the optical axis is represented by G67.

14. The optical imaging lens according to claim 10, further satisfying an inequality:

Tmax/Gmax≥1.0, wherein a maximum of the central thickness from the first lens element to the seventh lens element along the optical axis is represented by Tmax, and a maximum of the six air gaps from the first lens element to the seventh lens element along the optical axis is represented by Gmax.

15. The optical imaging lens according to claim 10, further satisfying an inequality:

(T4+T5)/T3≥2.0, wherein a central thickness of the fourth lens element along the optical axis is represented by T4, a central thickness of the fifth lens element along the optical axis is represented by T5, and a central thickness of the third lens element along the optical axis is represented by T3.

16. The optical imaging lens according to claim 10, further satisfying an inequality:

TL/(T1+G12+T2)≤4.5, wherein a distance from the object-side surface of the first lens element to the image-side surface of the seventh lens element along the optical axis is represented by TL, a central thickness of the first lens element along the optical axis is represented by T1, an air gap between the first lens element and the second lens element along the optical axis is represented by G12, and a central thickness of the third lens element along the optical axis is represented by T2.

17. The optical imaging lens according to claim 10, further satisfying an inequality: T1/T2≥2.0, wherein a central thickness of the first lens element along the optical axis is represented by T1, and a central thickness of the second lens element along the optical axis is represented by T2.

18. The optical imaging lens according to claim 10, further satisfying an inequality:

EFL/(T1+T2)≤5.1, wherein an effective focal length of the optical imaging lens is represented by EFL, a central thickness of the first lens element along the optical axis is represented by T1, and a central thickness of the second lens element along the optical axis is represented by T2.

* * * * *